(12) United States Patent
Chung et al.

(10) Patent No.: US 10,577,285 B2
(45) Date of Patent: Mar. 3, 2020

(54) NON-FERROELECTRIC HIGH DIELECTRIC AND PREPARATION METHOD THEREOF

(71) Applicant: Korea Advanced Institute of Science and Technology, Daejeon (KR)

(72) Inventors: Sung Yoon Chung, Daejeon (KR); Hye In Yoon, Daejeon (KR); Gi Young Jo, Suwon-si (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 15/972,660

(22) Filed: May 7, 2018

(65) Prior Publication Data

US 2018/0327317 A1    Nov. 15, 2018

(30) Foreign Application Priority Data

May 11, 2017   (KR) ........................ 10-2017-0058496

(51) Int. Cl.
| | | |
|---|---|---|
| C04B 35/47 | (2006.01) | |
| B28B 11/24 | (2006.01) | |
| B28B 3/00 | (2006.01) | |

(52) U.S. Cl.
CPC .............. *C04B 35/47* (2013.01); *B28B 3/003* (2013.01); *B28B 11/243* (2013.01); *C04B 2235/3201* (2013.01); *C04B 2235/3227* (2013.01); *C04B 2235/3251* (2013.01); *C04B 2235/785* (2013.01); *C04B 2235/85* (2013.01)

(58) Field of Classification Search
CPC .............. C04B 35/47; C04B 35/62685; C04B 35/62675; C04B 35/4682; C04B 35/6262; C04B 2235/768; C04B 2235/664; C04B 2235/663; C04B 2235/6582; C01G 23/003; C01G 23/006; C01G 23/00; C01G 23/005; H01G 4/1227; H01B 3/12
See application file for complete search history.

(56) References Cited

U.S. PATENT DOCUMENTS 5,580,506 A    12/1996  Kang et al.
7,939,007 B2*   5/2011  Guillemet .............. B82Y 30/00
                                                       264/434

(Continued)

FOREIGN PATENT DOCUMENTS

JP       5012600       5/1975
JP       5198408 A     8/1993

(Continued)

OTHER PUBLICATIONS

Wang et al. Phase diagram and enhanced piezoelectricity in the strontium titanate doped potassium-sodium niobate solid solution. phys. stat. sol. (a) 202, No. 6, R57-R59 (2005).*

(Continued)

*Primary Examiner* — Noah S Wiese
(74) *Attorney, Agent, or Firm* — The Webb Law Firm

(57) ABSTRACT

Provided is a method for preparing a grain boundary insulation-type dielectric. The method includes the steps of obtaining a titanic acid compound and a ferroelectric having a value less than a melting point of the titanic acid compound; obtaining a mixture by adding the ferroelectric material to the titanic acid compound; and sintering the mixture at a temperature equal to or more than a melting point of the ferroelectric material.

16 Claims, 27 Drawing Sheets

(56) References Cited

U.S. PATENT DOCUMENTS

| | | | |
|---|---|---|---|
| 7,993,965 B2 | 8/2011 | Ino et al. | |
| 8,040,658 B2* | 10/2011 | Kawamoto | C01G 23/006 |
| | | | 361/306.1 |
| 2006/0288928 A1* | 12/2006 | Eom | C30B 23/02 |
| | | | 117/89 |
| 2008/0009578 A1* | 1/2008 | Khatua | C08K 3/22 |
| | | | 524/431 |
| 2010/0027191 A1* | 2/2010 | Guillemet | B82Y 30/00 |
| | | | 361/321.1 |
| 2011/0217519 A1* | 9/2011 | Sakashita | B32B 9/00 |
| | | | 428/172 |
| 2012/0074521 A1* | 3/2012 | Imanaka | B82Y 30/00 |
| | | | 257/532 |
| 2017/0162335 A1* | 6/2017 | Ritter | H01G 7/06 |

FOREIGN PATENT DOCUMENTS

| | | | | |
|---|---|---|---|---|
| JP | H05-198408 A | * | 8/1993 | ............... H01C 7/10 |
| JP | 7254526 A | | 10/1995 | |
| JP | 2001223072 A | | 8/2001 | |
| JP | 2006287045 A | | 10/2006 | |
| JP | 201328478 A | | 2/2013 | |
| WO | 2009001690 A1 | | 12/2008 | |
| WO | 2009119335 A1 | | 10/2009 | |

OTHER PUBLICATIONS

Chang et al., "Properties of (Na0.5K0.5)NbO3—SrTiO3 based led-free ceramics and surface acoustic wave devices", Sensors and Actuators A, 2007, pp. 267-272, vol. 136.

* cited by examiner (100-x)(Sr$_{0.95}$La$_{0.05}$)Ti$_{1.01}$O$_3$ -x KNN
SINTERING: 1450 °C, N$_2$, 2 HOURS
SUBSEQUENT HEAT TREATMENT: 1200 °C, NORMAL PRESSURE(AIR), 30 MINUTES

NON-FERROELECTRIC HIGH DIELECTRIC AND PREPARATION METHOD THEREOF

CROSS-REFERENCE TO RELATED APPLICATION

This application claims priority to Korean Patent Application No. 10-2017-0058496 filed May 11, 2017, the disclosure of which is hereby incorporated in its entirety by reference.

TECHNICAL FIELD

The present invention relates to a non-ferroelectric high electric and a preparation method thereof, and more particularly, to a grain boundary insulation-type dielectric consisting of semiconducting titanic acid compound particles and insulating grain boundaries, and a preparation method thereof.

BACKGROUND ART

A dielectric material is a material in which polarization is generated when an electric field is applied thereto, and is used in electronic devices because the dielectric material serves to stabilize power supply by storing a predetermined amount of electricity when the dielectric material is used as a capacitor and alleviate an influx of sparks into a circuit in an alternating current power supply.

Existing ceramic capacitors are classified into Class I and II. Class I is for temperature compensation, has a very small capacitance change rate according to the temperature, and good high-frequency characteristics, and uses a paraelectric such as $(Ca,Sr)(Ti,Zr)O_3$. Class II is for temperature compensation and has an aspect in which a change in dielectric constant according to the temperature is large and change widths in dielectric constant and dielectric loss under alternating and direct current voltages are large, but has a high dielectric constant value and uses a ferroelectric such as $(Ba,Ca)(Ti,Zr)O_3$.

In the early period of development of ceramic capacitors in order to develop a high capacitance capacitor, studies using $Pb(Ti, Zr)O_3$ having a relative dielectric constant of approximately 200,000 as a base material have been conducted, but due to problems in that lead is hazardous to the environment and human bodies, studies using $(Ba,Ca)(Ti,Zr)O_3$ which is Class II for a high dielectric constant, and the like as a base material have been actively conducted.

Currently, in order to improve the relative dielectric constant and enhance temperature stability, studies in which various additives are mixed or a core-shell structure is formed or subjected to grain boundary segregation during a heat treatment process after additives are mixed, or studies in which a heat treatment is performed by chemically coating an initial powder, and then preparing a molded body have been mainly conducted.

Recently, as electronic devices have been rapidly reduced in size due to the development of technology, industrially used capacitors are greatly required to have high capacitance and achieve reduction in size. That is, there is a need for developing a dielectric material which is used in a stack-type ceramic capacitor due to the high relative dielectric constant, or has small particles for reduction in size of a capacitor.

In a grain boundary insulation-type capacitor consisting of semiconducting particles and insulating grain boundaries, it is assumed that capacitors at the grain boundary are connected in series. In this case, a capacitance, which is a physical quantity exhibiting an ability of an object to accumulate electric charge, is a value obtained by dividing the number of capacitors connected in series in the capacitance of a grain boundary. When the thickness of a sample is $d_c$, the size of a particle is $d_b$, the thickness of a grain boundary is $d_{gb}$, the relative dielectric constant of the grain boundary is $\varepsilon_{gb}$, and the surface area is A, the number of capacitors connected in series, n is $$n = \frac{d_c}{d_b}$$

and the capacitance of a grain bound, $C_{gb}$ is $$Cgb = \varepsilon_0 \varepsilon_{gb} \frac{A}{d_{gb}}$$

Accordingly, the total capacitor of n capacitors of the capacitance $C_{gb}$, which are connected in series, is $$C = \frac{C_{gb}}{n}$$
$$= \frac{\varepsilon_0 \varepsilon_{gb} A}{d_{gb}} \frac{d_b}{d_c}$$

and the apparent dielectric constant, $\varepsilon_{app}$ is $$\varepsilon_{app} = \varepsilon_{gb} \frac{d_b}{d_{gb}}$$

In order for the capacitor to achieve reduction in size and have a high capacitance, the particle size ($d_b$) needs to be small, but when the particle size becomes small, there is a problem in that the apparent dielectric constant ($\varepsilon_{app}$) also becomes small.

SUMMARY OF THE INVENTION

The present invention has been made in an effort to solve the aforementioned problems, and an object thereof is to provide a non-ferroelectric high electric which has a high relative dielectric constant even in small particle sizes, and has a narrow change width in dielectric constant vs. the temperature, and a high relative dielectric constant and a low dielectric loss even in a high frequency region, and a preparation method thereof.

An exemplary embodiment of the present invention provides a method for preparing a grain boundary insulation-type dielectric, the method including: obtaining a titanic acid compound and a ferroelectric having a value less than a melting point of the titanic acid compound; obtaining a mixture by adding the ferroelectric material to the titanic acid compound; and sintering the mixture at a temperature equal to or more than a melting point of the ferroelectric material.

The titanic acid compound is characterized by being $SrTiO_3$.

The titanic acid compound is characterized by being $(Sr_xA_y)Ti_zO_3$. (Here, A is an element having a valence of 3 or more, $0.95 \leq x \leq 0.99$, $0.01 \leq y \leq 0.05$, $1.00 \leq z \leq 1.01$, and $x+y=1$.)

The titanic acid compound is characterized by being $(Sr_xLa_y)Ti_zO_3$. (Here, $0.95 \leq x \leq 0.99$, $0.01 \leq y \leq 0.05$, $1.00 \leq z \leq 1.01$, and $x+y=1$.)

The sintering may include sintering under a reducing atmosphere and a subsequent heat treatment under an oxidizing atmosphere, and the subsequent heat treatment under the oxidizing atmosphere is characterized by being performed under normal pressure.

The titanic acid compound is characterized by being may be $BaTiO_3$.

The titanic acid compound is characterized by being $(Ba_xA_y)Ti_zO_3$. (Here, A is an element having a valence of 3 or more, $0.95 \leq x \leq 0.99$, $0.01 \leq y \leq 0.05$, $1.00 \leq z \leq 1.01$, and $x+y=1$.)

The titanic acid compound is characterized by being $(Ba_xLa_y)Ti_zO_3$. (Here, $0.95 \leq x \leq 0.99$, $0.01 \leq y \leq 0.05$, $1.00 \leq z \leq 1.01$, and $x+y=1$.)

The method is characterized by further including adding tetraethyl orthosilicate (TEOS) to the mixture of the titanic acid compound and the ferroelectric.

The method is characterized by further including subjecting the mixture to pre-heat treatment (prefiring) prior to the sintering.

The sintering is characterized by including sintering under a reducing atmosphere and a subsequent heat treatment under an oxidizing atmosphere, and the subsequent heat treatment under the oxidizing atmosphere is characterized by being performed under an $N_2$ atmosphere or normal pressure.

An addition ratio of the ferroelectric is characterized by being 2 to 20 mol % based on the titanic acid compound.

The ferroelectric material is characterized by being $ABO_3$, which has a perovskite structure. (Here, A is any one of K, Na and $K_{0.5}Na_{0.5}$, and B is any one of Nb and Ta.)

A ferroelectric having an $ABO_3$ structure in $(Sr_xLa_y)Ti_zO_3$ which is a strontium titanate compound is characterized by being distributed at a grain boundary of the strontium titanate compound. (Here, $0.95 \leq x \leq 0.99$, $0.01 \leq y \leq 0.05$, $1.00 \leq z \leq 1.01$, $x+y=1$, A is any one of K, Na and $K_{0.5}Na_{0.5}$, and B is any one of Nb and Ta.)

The grain boundary insulation-type dielectric is characterized by having an average particle size of 0.3 μm to 1 μm.

When the ferroelectric is $K_{0.5}Na_{0.5}NbO_3$, the grain boundary insulation-type dielectric is characterized by having a relative dielectric constant of 4,500 to 6,000 and a dielectric loss of 2 to 5% in a frequency region of 1 MHz or more.

When the ferroelectric is $KNbO_3$, the grain boundary insulation-type dielectric is characterized in that a change width in relative dielectric constant is maintained at 0 to 10 and a change width in dielectric loss is maintained at 0 to 5%, regardless of the frequency region.

A ferroelectric having an $ABO_3$ structure in $(Ba_xLa_y)Ti_zO_3$ which is a barium titanate compound is characterized by being distributed at a grain boundary of the barium titanate compound. (Here, $0.95 \leq x \leq 0.99$, $0.01 \leq y \leq 0.05$, $1.00 \leq z \leq 1.01$, $x+y=1$, A is any one of K, Na and $K_{0.5}Na_{0.5}$, and B is any one of Nb and Ta.)

The grain boundary insulation-type dielectric is characterized by having an average particle size of 0.2 μm to 1 μm.

When the ferroelectric is $K_{0.5}Na_{0.5}NbO_3$, the grain boundary insulation-type dielectric is characterized by having a relative dielectric constant of 1,400 to 3,200 and a dielectric loss of 10 to 20% in a frequency region of 1 MHz or more.

The grain boundary insulation-type dielectric is characterized in that a change width in relative dielectric constant is maintained at 0 to 20 and a change width in dielectric loss is maintained at 0 to 2%, regardless of the frequency region.

A ratio of the ferroelectric in the grain boundary insulation-type dielectric is characterized by being 2 to 20 mol % based on the titanic acid compound.

The present invention is a grain boundary insulation-type dielectric consisting of titanic acid compound-based particles having a size of less than 1 μm and a ferroelectric grain boundary, and a dielectric based on a strontium titanate compound exhibits a high relative dielectric constant and a low dielectric loss in spite of small particle sizes and has a small change width in the dielectric constant according to the change in temperature. Accordingly, the present invention is suitable for a high capacitance capacitor, and may reduce the size of an electric part.

In the case of a dielectric based on a barium titanate compound, when a subsequent heat treatment is performed under $N_2$, the dielectric has a high relative dielectric constant of 1,400 or more and a dielectric loss of 20% or less in a high frequency region of 1 MHz. In contrast, when a subsequent heat treatment is performed under normal pressure (air), the dielectric has a constant relative dielectric constant and the dielectric loss is also maintained at a low level, almost regardless of frequency.

Since ferroelectric materials ($K_{0.5}Na_{0.5}NbO_3$, $KNbO_3$, and $NaNbO_3$) non-hazardous to the environment and human bodies are used, the present invention is more eco-friendly than existing dielectrics.

However, the effects which the non-ferroelectric high electric and the preparation methods thereof according to exemplary embodiments of the present invention can achieve are not limited to those mentioned above, and the other effects not mentioned will be clearly understood by a person with ordinary skill in the art to which the present invention pertains from the following description.

BRIEF DESCRIPTION OF THE DRAWINGS

The accompanying drawings included as a part of the detailed description to assist understanding of the present invention provide exemplary embodiments of the present invention and explain the technical spirit of the present invention along with the detailed description.

DETAILED DESCRIPTION

Figure 1:
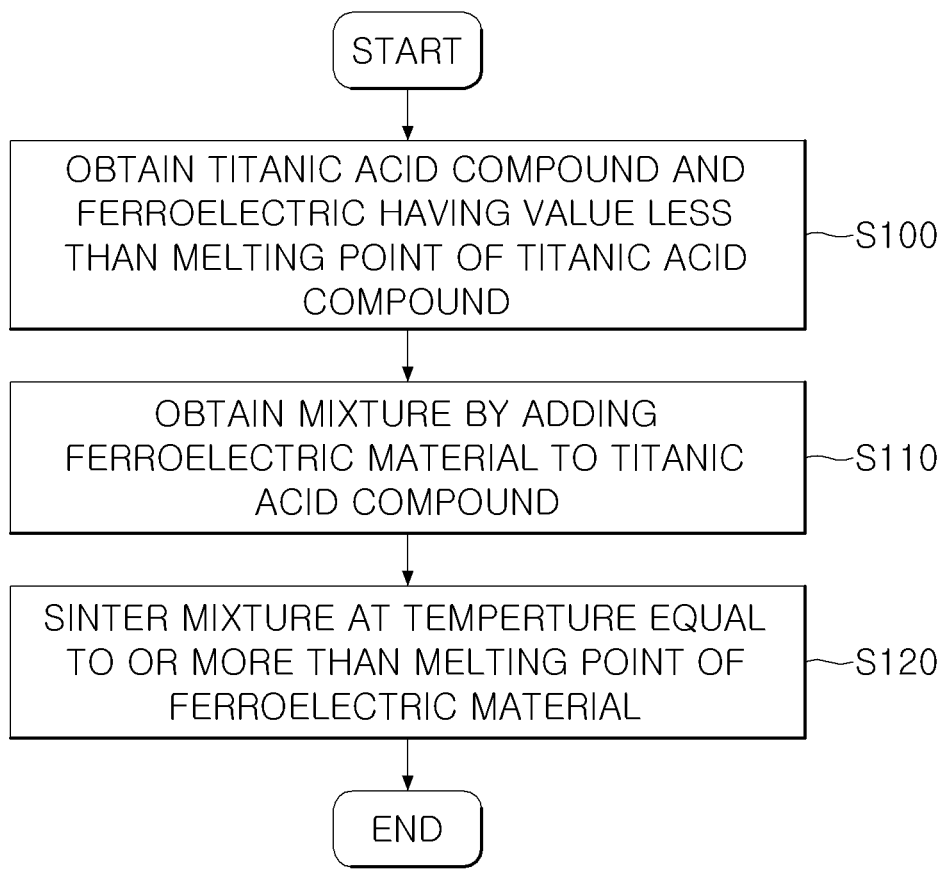
FIG. 1 is a flow chart explaining a method for preparing a grain boundary insulation-type dielectric according to an exemplary embodiment of the present invention.

The terms or words used in the present specification and the claims should not be construed as being limited as typical or dictionary meanings, and should be construed as meanings and concepts conforming to the technical spirit of the present invention on the basis of the principle that an inventor can appropriately define concepts of the terms in order to describe his or her own invention in the best way. Accordingly, since the exemplary embodiments described in the present specification and the configurations illustrated in the drawings are only the most preferred exemplary embodiment of the present invention and do not represent all of the technical spirit of the present invention, it is to be understood that various equivalents and modified embodiments, which may replace these exemplary embodiments and configurations, are possible at the time of filing the present application. Hereinafter, a non-ferroelectric high electric and a preparation method thereof according to an exemplary embodiment of the present invention will be described in detail with reference to the accompanying drawings.

Figure 2:
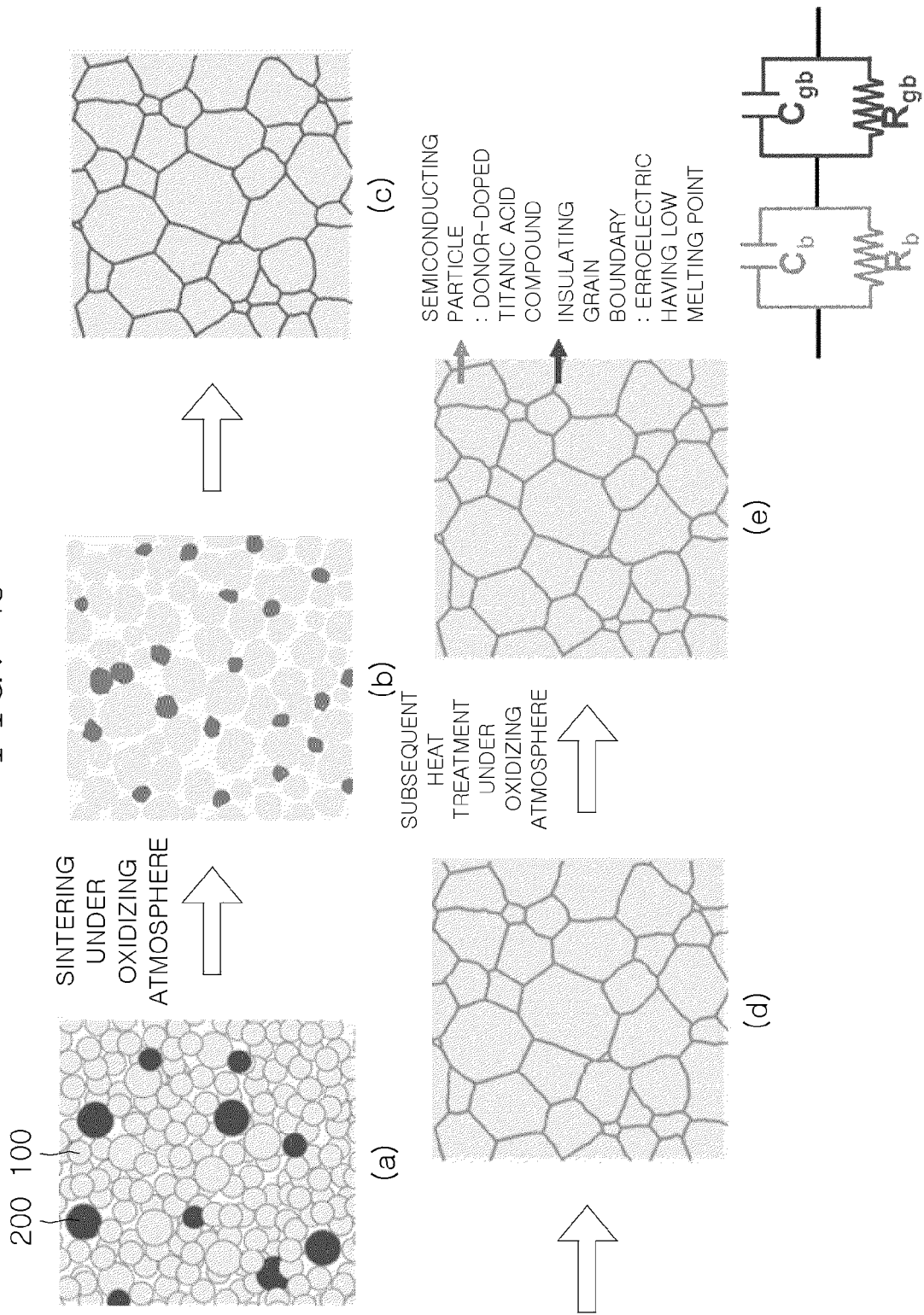
FIG. 2 is a schematic view illustrating a sintering process of the grain boundary insulation-type dielectric according to an exemplary embodiment of the present invention.

FIG. 1 is a flow chart explaining a method for preparing a grain boundary insulation-type dielectric according to an exemplary embodiment of the present invention, and FIG. 2 is a schematic view illustrating a sintering process of the grain boundary insulation-type dielectric according to an exemplary embodiment of the present invention.

Referring to FIG. 1, a method for preparing a grain boundary insulation-type dielectric will be described. A method for preparing a grain boundary insulation-type dielectric according to the present invention is characterized by including: obtaining a titanic acid compound and a ferroelectric having a value less than a melting point of the titanic acid compound (S100); obtaining a mixture by adding the ferroelectric material to the titanic acid compound (S110); and sintering the mixture at a temperature equal to or more than a melting point of the ferroelectric material (S120).

Step S100 will be described. The titanic acid compound (powder) is prepared by wet-milling, drying, grinding, and sieving a raw material powder, and calcining the resulting product. A ferroelectric material has a perovskite structure having a chemical formula of $ABO_3$, and in order to synthesize the ferroelectric material, the ferroelectric material is prepared by milling, drying, grinding, and sieving a raw material powder including A and B elements, and calcining the resulting product at a predetermined molar ratio in the same manner as in the titanic acid compound. Here, a melting point of the ferroelectric needs to be lower than that of the titanic acid compound.

Step S110 is a step of mixing the prepared titanic acid compound with the prepared ferroelectric. Since a ferroelectric 200 is entirely evenly distributed in a titanic acid compound 100 during the mixing of the titanic acid compound with the ferroelectric, the ferroelectric 200 allows a titanic acid compound grain boundary to permeate into a liquid phase to form a grain boundary during the preparation of a dielectric, thereby preparing a dielectric having large sizes.

Step S120 is a step of sintering a mixture of the titanic acid compound and the ferroelectric at a temperature equal to or more than a melting point of the ferroelectric material. FIG. 2(*c*) illustrates a state where the mixture prepared in step S110 is sintered at a temperature equal to or more than a melting point of the ferroelectric material. When the mixture is sintered at a temperature equal to or more than the melting point of the ferroelectric, the ferroelectric is melted, and thus evenly distributed among particles of the titanic acid compound 100. Preferably, as the sintering temperature, a temperature of approximately 70% to approximately 90% of the melting point of the titanic acid compound is suitable, but the sintering temperature is not limited thereto.

Referring to FIG. 2, step S120 according to the present invention will be specifically described.

The sintering step S120 is carried out by performing a process of sintering a mixture of the titanic acid compound 100 and the ferroelectric 200 under a reducing atmosphere and a subsequent heat treatment process under an oxidizing atmosphere.

FIG. 2(a) illustrates a form in which the titanic acid compound 100 and the ferroelectric 200 are mixed through step S110. It can be confirmed that the ferroelectric 200 is entirely evenly distributed in the titanic acid compound 100.

FIG. 2(b) illustrates a structure before the heat treatment temperature reaches a melting point of the ferroelectric 200 in performing sintering on the mixture of the titanic acid compound 100 and the ferroelectric 200 under a reducing atmosphere. When a sintering is performed under a reducing atmosphere, grain growth and densification of the titanic acid compound (for example, ST and BT) occur. Compared with FIG. 2(a), particles of the titanic acid compound aggregate, and as a result, the form is changed, but is not yet a completely densified form, so that it can be confirmed that empty spaces among the titanic acid compound particles are present. The ferroelectric 200 is present in the empty space. As the densification occurs, the empty spaces begin to be filled.

FIG. 2(c) illustrates a structure after the sintering temperature under a reducing atmosphere reaches the melting point of the ferroelectric 200.

As the heat treatment temperature passes through the melting point of the ferroelectric, the phase of the ferroelectric is changed from the solid phase to the liquid phase, and the ferroelectric flows into the grain boundary. In this case, grain growth and densification of the titanic acid compound (for example, ST and BT) actively occur, and simultaneously, the ferroelectric 200 in a liquid state is present at the grain boundary.

FIG. 2(d) illustrates a structure after the sintering under a reducing atmosphere is finished. When the temperature is lowered as the heat treatment is finished, that is, when the temperature is lowered to a temperature equal to or less than a melting point of the ferroelectric 200, the ferroelectric 200 in a liquid state present at the grain boundary is changed into a solid state.

FIG. 2(e) illustrates a structure after the subsequent heat treatment is performed under an oxidizing atmosphere. The reactions of Defect Chemical Formulae 3 and 4 mentioned below at the grain boundary occur, and as a result, the insulation property of the grain boundary is reinforced.

Meanwhile, the heat treatment step may be performed by lowering the sample to a room temperature state after the sintering under a reducing atmosphere, creating an atmosphere as an oxidizing atmosphere of a subsequent heat treatment at room temperature, and then increasing the temperature to the temperature of the subsequent heat treatment. However, after the sintering under a reducing atmosphere, the subsequent heat treatment may be performed by lowering the temperature to the subsequent heat treatment temperature, which is not in a room temperature state, and changing the atmosphere into the oxidizing atmosphere. In the case of the former, the ferroelectric in a liquid phase is changed into a solid phase when the temperature is lowered to room temperature after the completion of the sintering under a reducing atmosphere, and in the case of the latter, the ferroelectric in a liquid phase is changed into a solid phase when the temperature is lowered to the subsequent heat treatment temperature after the sintering under a reducing atmosphere.

The subsequent heat treatment may be performed at a temperature equal to or less than the melting point of the ferroelectric, and if the subsequent heat treatment is performed at a temperature equal to or more than the melting point, the ferroelectric at the grain boundary is present in a liquid phase even during the subsequent heat treatment, and is changed into a solid phase when the temperature is decreased to room temperature after the completion of the subsequent heat treatment.

As described above, for a titanic acid solid solution by the present invention, the process procedure is relatively simple because a two-step heat treatment process under a reducing atmosphere and under an oxidizing atmosphere is performed unlike existing methods of performing sintering on a power molded body, applying oxide to the powder molded body, and performing a heat treatment.

A principle in which a grain boundary insulation-type dielectric is formed through the sintering under a reducing atmosphere and the subsequent heat treatment under an oxidizing atmosphere will be specifically described by exemplifying a strontium titanate compound. A donor to be described in the present invention is a material having a valence larger than that of an element at a site to be added, and the donor may be added by substituting a strontium (Sr) site with lanthanum (La) or substituting the strontium (Sr) site with an element having a valence of 3 or more, which corresponds to lanthanum (La).

When a donor having a large valence substitutes the original atomic position, a positive charge is formed. In this case, an infiltration-type oxygen ion, a positive ion vacancy, or an electron is additionally formed and offsets a positive charge, and electrical neutrality is maintained.

Since it is difficult for an oxygen ion having a large ion size to enter the lattices, the infiltration-type oxygen ion is minimally formed, and when a heat treatment is performed at normal pressure in which an oxygen partial pressure is high, a positive ion vacancy is formed, and as the oxygen partial pressure is lowered, an electron rather than the positive ion vacancy is formed, thereby maintaining the electrical neutrality.

When the donor is added, the system is classified into three regions according to the oxygen partial pressure. The case where the oxygen partial pressure is very low, the case where the oxygen pressure is low, and the case where the oxygen partial pressure is high are shown in Defect Chemical Formulae 1 to 3, respectively in accordance with a Kroger-Vink notation method. V indicates a vacancy, the subscript and the superscript indicate an atom and an effective charge originally positioned at a site to be substituted, respectively, • indicates a positive effective charge, and ' indicates a negative effective charge.

Defect Chemical Formula 1 is a case where the oxygen partial pressure is very low as in a $H_2$ atmosphere, the electric conductivity is almost regardless of the concentration of a donor added, and as the oxygen partial pressure is increased, the electric conductivity is decreased.

$$O_O \rightarrow \frac{1}{2}O_2 + V_O^{\bullet\bullet} + 2e' \quad \text{(Defect Chemical Formula 1)}$$

When the oxygen partial pressure is low as in a $95N_2$-$5H_2$ or nitrogen atmosphere, and the like, the electric conductivity is almost regardless of the oxygen partial pressure, and since a donor additive forms free electrons according to Defect Chemical Formula 2, the electric conductivity is increased by the concentration of the additive.

$$Lo_2O_3(-2SrO) \rightarrow \quad \text{(Defect Chemical Formula 2)}$$
$$2La_{Sr}^* + 2O_O + \frac{1}{2}O_2 + 2e'$$
$$Nb_2O_5(-2TiO_2) \rightarrow$$
$$2Nb_{Ti}^* + 4O_O + \frac{1}{2}O_2 + 2e'$$

When the oxidizing atmosphere, that is, the oxygen partial pressure ($Po_2$) is high, strontium ion vacancies are formed according to Defect Chemical Formula 3, so that since free electrons are not formed and the electric charges are compensated by ions to achieve the electrical neutrality, the electric conductivity is decreased.

$$Lo_2O_3(-3SrO) \rightarrow 2La_{Sr}^* + V_{Sr}'' + 3O_O \quad \text{(Defect Chemical Formula 3)}$$
$$2Nb_2O_5(-5TiO_2) \rightarrow 4Nb_{Ti}^* + V_{Ti}'' + 10O_O$$

$$\frac{1}{2}O_2 + V_O^{\bullet\bullet} + 2e' \rightarrow O_O \quad \text{(Defect Chemical Formula 4)}$$

When the oxygen partial pressure is increased, oxygen in the atmosphere diffuses into the sintered body, and as a result, a reaction occurs in a right direction where an oxygen vacancy and an electron meet together, and since oxygen diffuses more rapidly at the grain boundary than in the grain, when a heat treatment is performed under an oxidizing atmosphere, an oxidation layer is formed only at the grain boundary and the resistance is increased. After the donor is added, a semiconducting sintered body is obtained by sintering under a reducing atmosphere (Defect Chemical Formulae 1 and 2), and then an insulating grain boundary is created by forming an oxidation layer only at the grain boundary (Defect Chemical Formulae 3 and 4) through a short subsequent heat treatment under an oxidizing atmosphere. Through sintering under a reducing atmosphere and a subsequent heat treatment process under an oxidizing atmosphere, a grain boundary insulation-type capacitor consisting of semiconducting particles and insulating grain boundaries may be prepared. Hereinafter, a process of performing each step will be described in detail through the examples.

Figure 3:
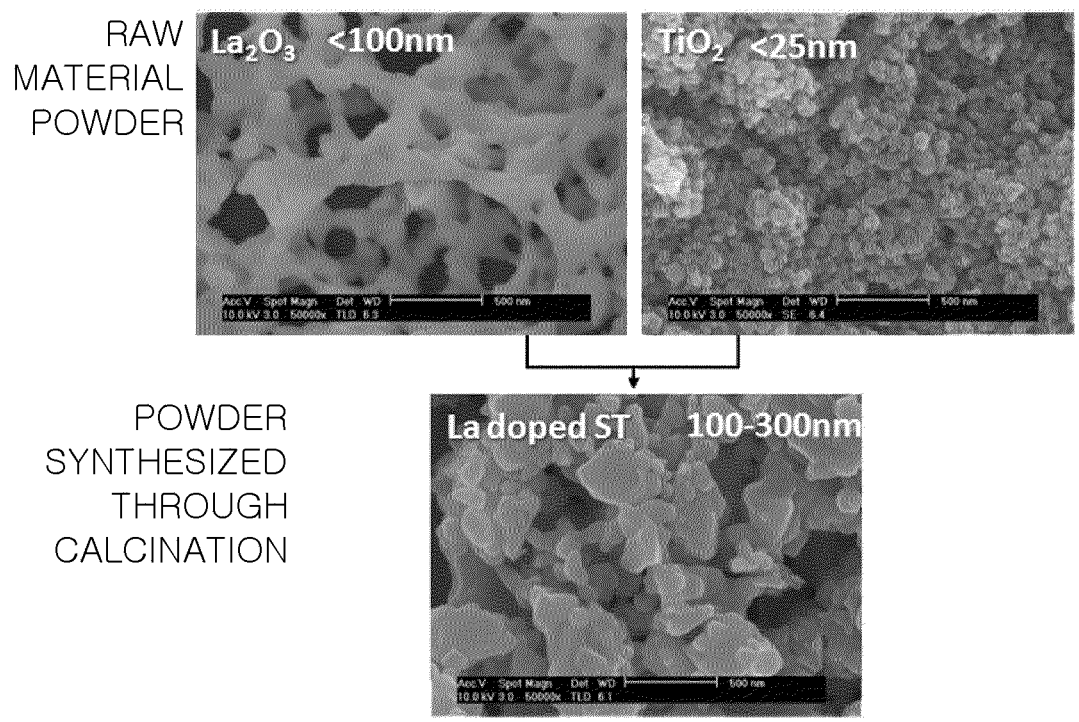
FIG. 3 is a scanning electron microscope image illustrating particle sizes of a $(Sr_{0.95}La_{0.05})Ti_{1.01}O_3$ compound according to an exemplary embodiment of the present invention and a raw material powder.

FIG. 3 is a scanning electron microscope image illustrating particle sizes of a $(Sr_{0.95}La_{0.05})Ti_{1.01}O_3$ compound according to an exemplary embodiment of the present invention and a raw material powder.

A titanic acid compound (powder) and a ferroelectric powder are prepared by each calcining $SrCO_3$, $La_2O_3$, $TiO_2$ and $KCO_3$, $NaCO_3$, and $Nb_2O_5$ raw material powders. As illustrated in FIG. 3, $(Sr_{0.95}La_{0.05})Ti_{1.01}O_3$ may be prepared by calcining $La_2O_3$ and $TiO_2$ powders. Hereinafter, $(Sr_{0.95}La_{0.05})Ti_{1.01}O_3$ is indicated by ST, $(Ba_{0.95}La_{0.05})$ $Ti_{1.01}O_3$ is indicated by BT, $(K_{0.5}Na_{0.5})NbO_3$ is indicated by KNN, and $KNbO_3$ is indicated by KN.

A method for preparing a high dielectric will be specifically described by exemplifying a case where the titanic acid compound is a strontium titanate compound. A high dielectric consisting of a strontium titanate compound is added in an amount of 1 to 5 mol % based on a site in which a donor additive acts as a donor, and contains a titanium (Ti) site at a molar ratio of 1.00 to 1.01 based on the strontium (Sr) site. After sintering is performed under a reducing atmosphere for 1 to 2 hours by adding a ferroelectric having a melting point equal to or less than the sintering temperature of the present compound in an amount of 2 to 20 mol % based on a strontium titanate ($SrTiO_3$) solid solution and mixing the strontium titanate ($SrTiO_3$) solid solution, a subsequent heat treatment is performed under an oxidizing atmosphere for 30 minutes to 1 hour.

In a donor, lanthanum (La) is added to a strontium (Sr) site or niobium (Nb) is added to a titanium (Ti) site, and the element is added in an amount of 1 to 5 mol % based on a position to be added. When the addition concentration is less than 1 mol %, semiconducting particles are not formed during sintering under a reducing atmosphere, and when the addition concentration is more than 5 mol %, the element added as the donor may be precipitated at the grain boundary, so that an addition concentration of 1 to 5 mol % is appropriate.

A ferroelectric having a melting point equal to or less than the sintering temperature of the present compound is melted during the sintering process of the compound, and thus enters between particles. When cooled after the sintering, the ferroelectric material remains at the grain boundary as it is, and thus, acts as an insulator in a grain boundary insulation-type capacitor model, thereby increasing the apparent dielectric constant of the grain boundary.

The ferroelectric having a melting point equal to or less than the sintering temperature of the present compound is $ABO_3$, where $A^+$=K, Na, $K_{0.5}Na_{0.5}$ or a mixture thereof and $B^{5+}$=Nb or Ta. Each melting point of $KNbO_3$, $KTaO_3$, $NaNbO_3$, $NbTaO_3$ and $K_{0.5}Na_{0.5}NbO_3$ is 1,039° C., 1,370° C., 1412° C., 1780° C., and 1140° C. to 1420° C., respectively [F. S. Galasso, "Perovskite and High Tc Superconductors," p. 176 Gordon and Breach Science Publishers, New York (1986); B. Jaffe, "Piezoelectric Ceramics; Academic Press: London, UK (1971)]. Accordingly, it is preferred that a ferroelectric added to the strontium titanate-based solid solution is $KNbO_3$, $KTaO_3$, $NaTaO_3$, or $K_{0.5}Na_{0.5}NbO_3$.

When the aforementioned ferroelectric is mixed with a strontium-based solid solution, in the case where the ferroelectric is present in an amount of less than 2 mol % based on the strontium-based solid solution, it is difficult for the ferroelectric to be uniformly present at all the grain boundaries during the sintering, and in the case where the ferroelectric is added in an amount of 20 mol % or more, the apparent dielectric constant ($\epsilon_{app}$) is rather decreased as the thickness ($d_{gb}$) of the grain boundary is increased. Accordingly, the ferroelectric to be added is appropriately present in an amount of 2 to 20 mol % based on the strontium-based solid solution.

Figure 4:
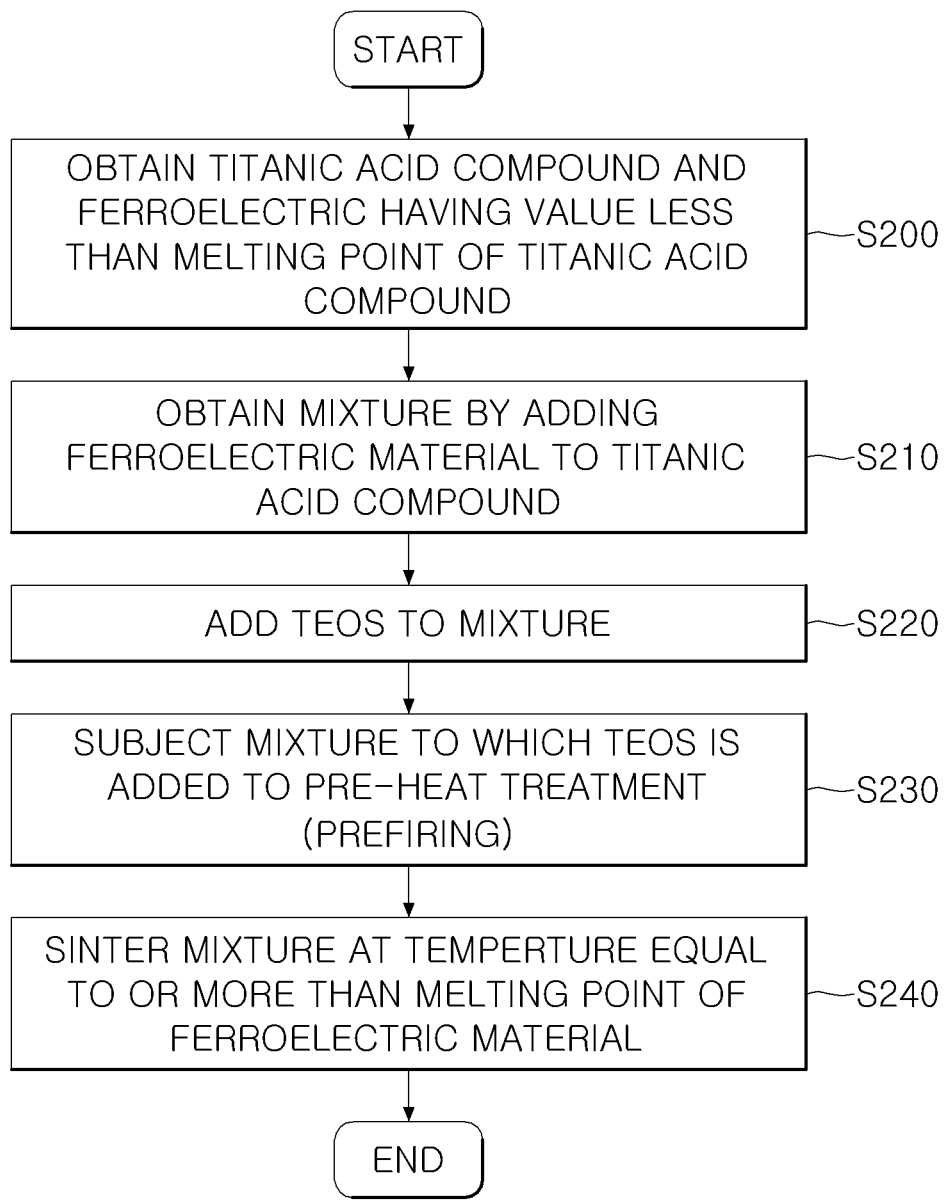
FIG. 4 is a flowchart illustrating a preparation method when a titanic acid compound is a barium titanate compound, in the grain boundary insulation-type dielectric according to an exemplary embodiment of the present invention.

FIG. 4 is a flowchart illustrating a preparation method when a titanic acid compound is a barium titanate compound, in the grain boundary insulation-type dielectric according to an exemplary embodiment of the present invention.

A method for preparing a high dielectric (S200, S210, and S240) when the titanic acid compound is a barium titanate compound ($BaTiO_3$) is similar to the aforementioned method for preparing a strontium titanate compound.

However, as illustrated in FIG. 4, in the case of a high dielectric based on a barium titanate compound, a step of adding TEOS to a ferroelectric material and a titanic acid compound (S220) and a step of subjecting a mixture to which the TEOS is added to pre-heat treatment (prefiring) S230 may be additionally performed. Meanwhile, barium titanate is similar to the case of strontium titanate, and the donor may be added by substituting a barium (Ba) site with lanthanum (La) or substituting the barium (Ba) site with an element having a valence of 3 or more, which corresponds to lanthanum (La).

The difference between detailed process conditions of barium titanate and strontium titanate will be described through the Examples described below.

The present invention will be specifically described through the following Examples. However, the following Examples are provided for illustrative purposes only, and are not intended to limit the technical scope of the present invention.

EXAMPLE 1

In Example 1 according to the present invention, a dielectric having a composition of $(100-x)(Sr_{0.95}La_{0.05})Ti_{1.01}O_3$-xKN (x=2, 5, 10, 15, and 20) was prepared.

Raw material powders used to prepare these dielectrics are $SrCO_3$, $La_2O_3$, $TiO_2$, $KCO_3$, and $Nb_2O_5$. $TiO_2$ was allowed to have an average particle size of several hundred nanometers after all the processes were completed by using a powder having a size of several tens of nanometers. $La_2O_3$ was used as a donor additive, and $KCO_3$ and $Nb_2O_5$ were separately synthesized and allowed to be positioned at the grain boundary during the sintering process of strontium titanate to which the donor was added.

First, lanthanum (La) was positioned at an Sr site to act as a donor, and Sr, La, and Ti were put into a polyethylene bottle at a molar ratio of Sr:La:Ti=0.95:0.05:1.01 in order to slightly exceed Ti, and the resulting mixture was wet-milled with $ZrO_2$ balls for 24 hours by using an alcohol solvent. After the product was dried on a hot plate until the slurry state was reached, the dried product was completely dried in an oven at 80° C., ground in an agate mortar, and then sieved.

When the melting point is lower than that of a strontium titanate compound, K and Nb at a molar ratio of K:Nb=1:1 were milled, dried, ground, and sieved in the same manner as in the above-described method in order to synthesize a ferroelectric $KNbO_3$ having a perovskite structure.

A strontium titanate raw material mixed powder to which lanthanum (La) was added and a $KNbO_3$ raw material mixed powder were calcined at 1,300° C. for 4 hours and at 850° C. for 4 hours, respectively, by using an electric furnace in the form of a box. Preferably, the raw material mixture of strontium titanate may be calcined at 1,250 to 1,300° C., and the $KNbO_3$ raw material mixed powder may be calcined at 800 to 900° C.

$KNbO_3$ was added at a molar ratio of 0, 5, 10, 15, and 20:1 to the synthesized strontium titanate-based powder, and the resulting mixture was put into a polyethylene bottle and wet-milled with zirconia ($ZrO_2$) balls for 24 hours by using an alcohol solvent. The resulting product was milled, dried, ground, and sieved in the same manner as in the above-described method. In order to manufacture a grain boundary insulation-type capacitor, a synthesized powder was injected into a metal mold having a diameter of 12 mm, primarily molded, and isostatically molded at 200 MPa for 5 minutes (preferably 5 to 10 minutes).

Highly dense semiconducting particles were prepared by sintering the prepared molded body at 1,450° C. under a nitrogen atmosphere in a vertical tube furnace for 2 hours. Thereafter, the grain boundary was oxidized by performing a subsequent heat treatment under conditions of 1,200° C., normal pressure, and 30 minutes in the vertical tube furnace, and a grain boundary insulation-type capacitor was prepared. Preferably, the heat treatment under the reducing atmosphere may be performed at 1,300 to 1,500° C., and the heat treatment under the oxidizing atmosphere may be performed at 1,100 to 1,200° C.

EXAMPLE 2

In Example 2 according to the present invention, a dielectric having a composition of (100-x)ST-xKNN (x=2, 5, 10, 15, and 20) was prepared.

Raw material powders used to prepare these dielectrics are $SrCO_3$, $La_2O_3$, $TiO_2$, $KCO_3$, $NaCO_3$, and $Nb_2O_5$, and $TiO_2$ was allowed to have an average particle size of several hundred nanometers after all the processes were completed by using a powder having a size of several decade nanometers.

First, Sr, La, and Ti were put into a polyethylene bottle at a molar ratio of Sr:La:Ti=0.95:0.05:1.01 in order to slightly exceed Ti, and the resulting mixture was wet-milled with zirconia ($ZrO_2$) balls for 24 hours by using an alcohol solvent. After the product was dried on a hot plate until the slurry state was reached, the dried product was completely dried in an oven at 80° C., ground in an agate mortar, and then sieved. K and Nb at a molar ratio of K:Nb=1:1 were milled, dried, ground, and sieved in the same manner as in the above-described method in order to synthesize $K_{0.5}Na_{0.5}NbO_3$.

A strontium titanate raw material mixed powder to which lanthanum (La) was added and a $K_{0.5}Na_{0.5}NbO_3$ raw material mixed powder were calcined at 1,300° C. for 4 hours and at 900° C. for 4 hours, respectively, by using an electric furnace in the form of a box. Preferably, the raw material mixture of strontium titanate may be calcined at 1,250 to 1,300° C., and the $K_{0.5}Na_{0.5}NbO_3$ raw material mixed powder may be calcined at 800 to 900° C.

$K_{0.5}Na_{0.5}NbO_3$ was added at a molar ratio of 0, 5, 10, 15, and 20:1 to the synthesized strontium titanate-based powder, and the resulting mixture was put into a polyethylene bottle and wet-milled with zirconia ($ZrO_2$) balls for 24 hours by using an alcohol solvent. The resulting product was milled, dried, ground, and sieved in the same manner as in the above-described method. In order to manufacture a grain boundary insulation-type capacitor, a synthesized powder was injected into a metal mold having a diameter of 12 mm, primarily molded, and isostatically molded at 200 MPa for 5 minutes.

Highly dense semiconducting particles were prepared by sintering the prepared molded body at 1,450° C. under a nitrogen atmosphere in a vertical tube furnace for 2 hours. Thereafter, a grain boundary insulation-type capacitor was prepared by oxidizing the grain boundary through a subsequent heat treatment at 1,200° C. and normal pressure for 30 minutes in the vertical tube furnace. Preferably, the heat treatment under the reducing atmosphere may be performed at 1,300 to 1,500° C., and the heat treatment under the oxidizing atmosphere may be performed at 1,100 to 1,200° C.

Figure 5:
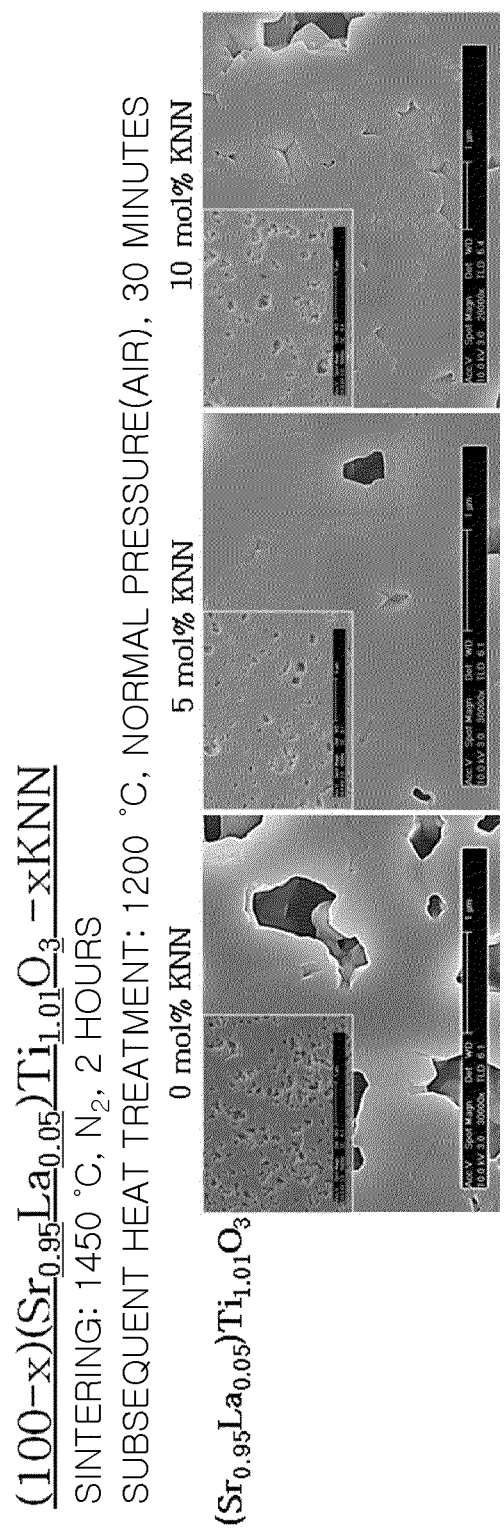
FIG. 5 is a scanning electron microscope image illustrating the micro structures of the samples of $(100-x)(Sr_{0.95}La_{0.05})Ti_{1.01}O_3$-xKNN according to an exemplary embodiment of the present invention.

FIG. 5 is a scanning electron microscope image illustrating the micro structures of the samples of (100-x)ST-xKNN according to an exemplary embodiment of the present invention. The sintering under the reducing atmosphere and the subsequent heat treatment under the oxidizing atmosphere were performed under conditions of 1,450° C., $N_2$, and 2 hours and under conditions of 1,200° C., normal pressure (air), and 30 minutes, respectively.

EXAMPLE 3

In Example 3 according to the present invention, a dielectric having a composition of (100-x)(Ba$_{0.95}$La$_{0.05}$)Ti$_{1.01}$O$_3$-xK$_{0.5}$Na$_{0.5}$NbO$_3$ (x=2, 5, 10, 15, and 20) was prepared.

Raw material powders used to prepare these dielectrics are $BaCO_3$, $La_2O_3$, $TiO_2$, $KCO_3$, $NaCO_3$, and $Nb_2O_5$, and $TiO_2$ was allowed to have an average particle size of several hundred nanometers after all the processes were completed by using a powder having a size of several decade nanometers.

First, Ba, La, and Ti were put into a polyethylene bottle at a molar ratio of Sr:La:Ti=0.95:0.05:1.01, and the resulting mixture was wet-milled with zirconia ($ZrO_2$) balls for 24 hours by using an alcohol solvent. After the product was dried on a hot plate until the slurry state was reached, the dried product was completely dried in an oven at 80° C., ground in an agate mortar, and then sieved. K and Nb at a molar ratio of K:Nb=1:1 were milled, dried, ground, and sieved in the same manner as in the above-described method in order to synthesize $K_{0.5}Na_{0.5}NbO_3$.

A barium titanate raw material mixed powder to which lanthanum (La) was added and a $K_{0.5}Na_{0.5}NbO_3$ raw material mixed powder were calcined at 1,100° C. for 4 hours and at 900° C. for 4 hours, respectively by using an electric furnace in the form of a box.

$K_{0.5}Na_{0.5}NbO_3$ was added at a molar ratio of 0, 5, 10, 15, and 20:1 to the synthesized strontium titanate-based powder, 0 to 8 wt % of tetra-ethyl ortho silicate (TEOS) was added thereto, the resulting mixture was put into a polyethylene bottle and wet-milled with $ZrO_2$ balls for 24 hours by using an alcohol solvent, and the resulting product was milled, dried, ground, and sieved in the same manner as in the above-described method. When 0.5 to 8 wt % of TEOS is added thereto, dielectric characteristics may be improved. In order to manufacture a grain boundary insulation-type capacitor, a synthesized powder was injected into a metal mold having a diameter of 12 mm, primarily molded, and isostatically molded at 200 MPa for 5 minutes.

A molded body prepared prior to the sintering was subjected to a pre-heat treatment (prefiring) process maintained under a $5H_2$-$95N_2$ atmosphere (reducing atmosphere) at 900° C. for 5 hours in a vertical tube furnace. By performing a pre-heat treatment (prefiring) prior to the sintering, the density of the high dielectric may be increased, and a change in dielectric constant according to the frequency may be caused to occur less than before. The pre-heat treatment (prefiring) was performed under a $5H_2$-$95N_2$ atmosphere, and thus may be performed under the same atmosphere as the sintering under a reducing atmosphere. It is possible to remove impurities introduced therein during the process of preparing the powder through the pre-heat treatment (prefiring).

After the pre-heat treatment (prefiring), highly dense semiconducting particles were prepared by performing sintering under a $5H_2$-$95N_2$ atmosphere (reducing atmosphere) at 1,200 to 1,280° C. for 2 hours. Thereafter, a capacitor was prepared by oxidizing the grain boundary through a subsequent heat treatment at 1,000 to 1,100° C. under $N_2$ or normal pressure (both under an oxidizing atmosphere) in a vertical tube furnace for 30 minutes. In the heat treatment temperature and atmosphere, a desired reaction did not occur out of the temperature range, so that it was experimentally confirmed that in the prepared dielectric, dielectric characteristics and mechanical characteristics significantly deteriorated.

In the case of (Ba$_{0.95}$La$_{0.05}$)Ti$_{1.01}$O$_3$, both $N_2$ and normal pressure are under an oxidizing atmosphere, but the difference in dielectric characteristics was exhibited due to the difference in degree of oxidation. When the heat treatment was performed under $N_2$, a high dielectric constant (high relative dielectric constant or high dielectric constant) was exhibited, whereas when the heat treatment was performed under normal pressure, a stable dielectric constant and a low dielectric loss (loss tangent, tan δ) were exhibited in a wide frequency region of 100 Hz to 1 MHz.

Figure 6:
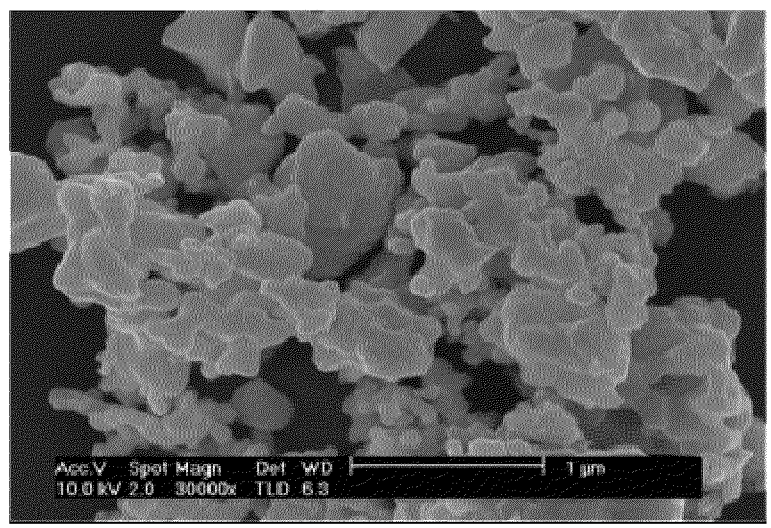
FIG. 6 is a scanning electron microscope image of $(Ba_{0.95}La_{0.05})Ti_{1.01}O_3$ powder prepared through a calcination process according to an exemplary embodiment of the present invention.
Figure 7:
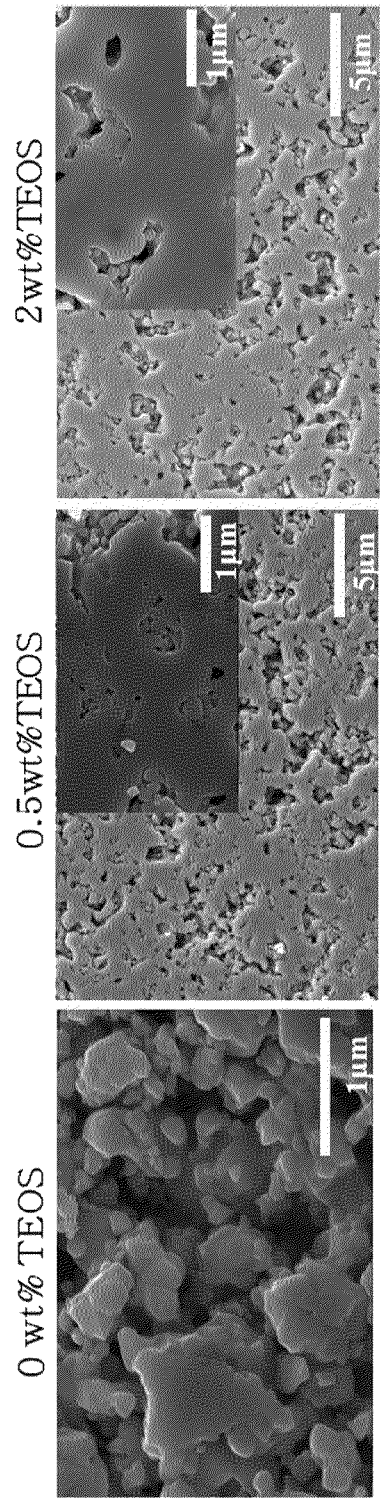
FIG. 7 is a scanning electron microscope image illustrating changes in micro structures according to the content of TEOS in $90(Ba_{0.95}La_{0.05})Ti_{1.01}O_3$-10KNN according to an exemplary embodiment of the present invention.

FIG. 6 is a scanning electron microscope image of (Ba$_{0.95}$La$_{0.05}$)Ti$_{1.01}$O$_3$ powder prepared through a calcination process according to an exemplary embodiment of the present invention, and FIG. 7 is a scanning electron microscope image illustrating changes in micro structures according to the content of TEOS in 90(Ba$_{0.95}$La$_{0.05}$)Ti$_{1.01}$O$_3$-10KNN. The sintering under the reducing atmosphere and the subsequent heat treatment under the oxidizing atmosphere were performed under conditions of 1,200° C., $5H_2$-$95N_2$, and 2 hours and under conditions of 1,100° C., normal pressure (air), and 30 minutes, respectively.

Analysis Example

After a cross-section of the strontium titanate compound prepared in Example 1 was cut, the compound was sequentially polished by using 6 μm, 3 μm, and 1 μm diamond suspensions. Thereafter, thermal etching was performed at 1,000 to 1,100° C. in a vertical tube furnace for 1 minute, and then quenching was performed under air atmosphere, and in order to prevent a phenomenon in which electrons are accumulated on a surface of a sample when electrons are injected thereinto, the surface was coated with osmium (Os) and observed by a scanning electronic microscopy.

After the upper and lower surfaces of the solid solution were polished to 30 μm, a silver paste (Ag paste) was applied on one surface thereof by a silk screen technique, and organic materials included in the paste were removed by drying the paste in an oven at 120° C. for 30 minutes. The same process was also repeated on the opposite surface. The relative dielectric constant and the dielectric loss were measured at 0.5 V and 100 Hz to 5.5 MHz. The average particle size was obtained by SEM, an XRD analysis was performed, and the relative dielectric constant and the dielectric loss were measured at 1 MHz.

Figure 8A:
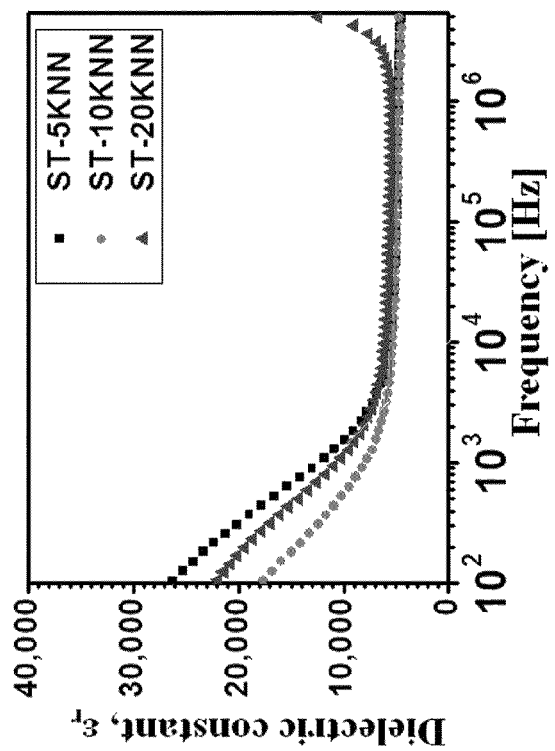
FIG. 8A is a graph illustrating changes in relative dielectric constant values according to the frequency measured in $(100-x)(Sr_{0.95}La_{0.05})Ti_{1.01}O_3$-xKNN according to the present invention.
Figure 8B:
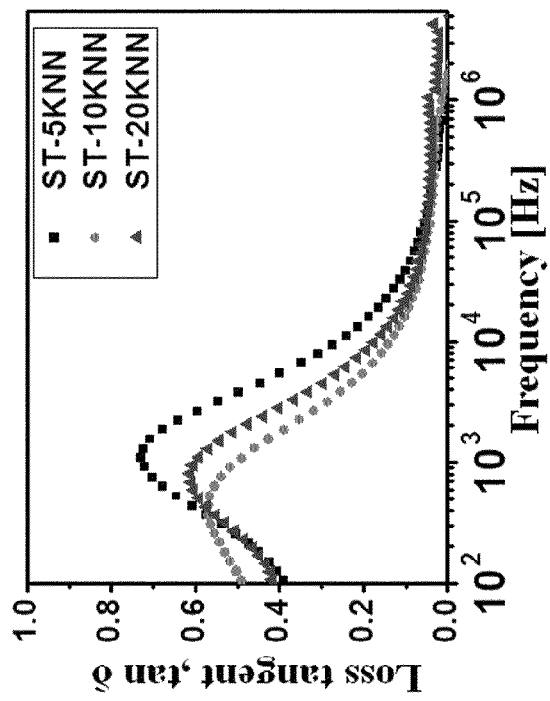
FIG. 8B is a graph illustrating changes in dielectric loss values.

FIG. 8A is a graph illustrating changes in relative dielectric constant values according to the frequency measured in (100-x)(Sr$_{0.95}$La$_{0.05}$)Ti$_{1.01}$O$_3$-xKNN according to the present invention, and FIG. 8B is a graph illustrating changes in dielectric loss values.

Referring to FIGS. 8A and 8B and Table 1, it can be confirmed that even though the dielectric based on the strontium titanate compound has small particle sizes, a high relative dielectric constant and a low dielectric loss are exhibited in a high frequency region. The following Table 1 shows a relative dielectric constant and a dielectric loss of the dielectric based on strontium titanate ($SrTiO_3$).

TABLE 1

| | composition and annealing condition | | | | | dielectric characteristics | | | | | |
|---|---|---|---|---|---|---|---|---|---|---|---|
| | donor | ferroelectric material | 2nd firing condition | | grain | dielectric constant, $\varepsilon_r$ | | | Dielectric loss, tan δ[%] | | |
| sample no. | La [mol %] | KNN [mol %] | temperature | atmosphere | size [μm] | 10 kHz | 100 kHz | 1 MHz | 10 kHz | 100 kHz | 1 MHz |
| 1 | 5 | 5 | 1200 | air | 0.6 | 5,390 | 4,900 | 4,760 | 28.7 | 6.3 | 2.4 |
| 2 | 5 | 10 | 1200 | air | 0.7 | 5,100 | 4,850 | 4,680 | 11.3 | 3.6 | 2.8 |
| 3 | 5 | 20 | 1200 | air | 0.7 | 6,126 | 5,625 | 5,532 | 17.7 | 5.0 | 4.5 |

The dielectric based on the strontium titanate compound according to the present invention exhibited a high relative dielectric constant value of 4,600 or more and also exhibited a dielectric loss value of less than 5% in a particle size of 0.3 μm to 1 μm in a high frequency region of 1 MHz.

Figure 9A:
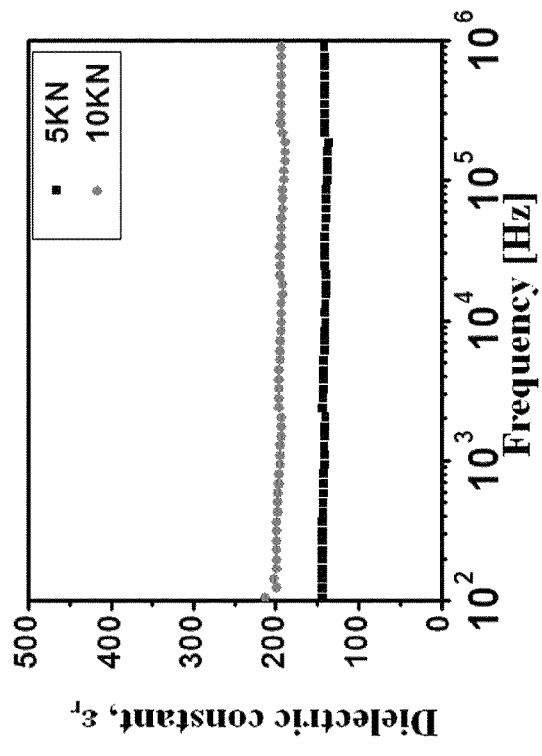
FIG. 9A is a graph illustrating changes in relative dielectric constant values according to the frequency measured in $(100-x)(Sr_{0.95}La_{0.05})Ti_{1.01}O_3$-xKN according to the present invention.
Figure 9B:
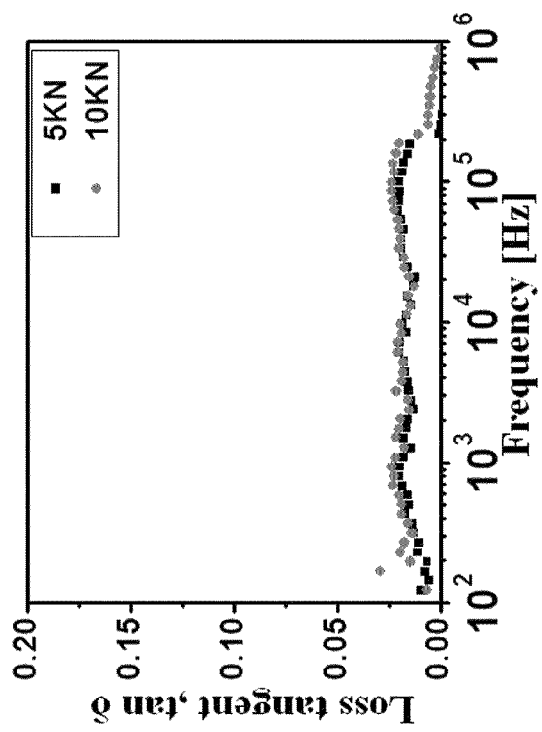
FIG. 9B is a graph illustrating changes in dielectric loss values.

FIG. 9A is a graph illustrating changes in relative dielectric constant values according to the frequency measured in (100-x)($Sr_{0.95}La_{0.05}$)$Ti_{1.01}O_3$-xKN according to the present invention, and FIG. 9B is a graph illustrating changes in dielectric loss values.

Referring to FIG. 9, it can be confirmed that the relative dielectric constant and dielectric loss values are constantly maintained without a significant change, regardless of the frequency region. It was confirmed that numerically, the relative dielectric constant was maintained within a change width of about 0 to 10, and the dielectric loss was maintained within a change width of about 0% to 5%. Meanwhile, the particle size of the dielectric exhibited a value of 0.5 μm or less.

The following Table 2 shows the relative dielectric constant and dielectric loss of the (100-x)($Sr_{0.95}La_{0.05}$)$Ti_{1.01}O_3$-xKN dielectric, and the like.

Figure 11A:
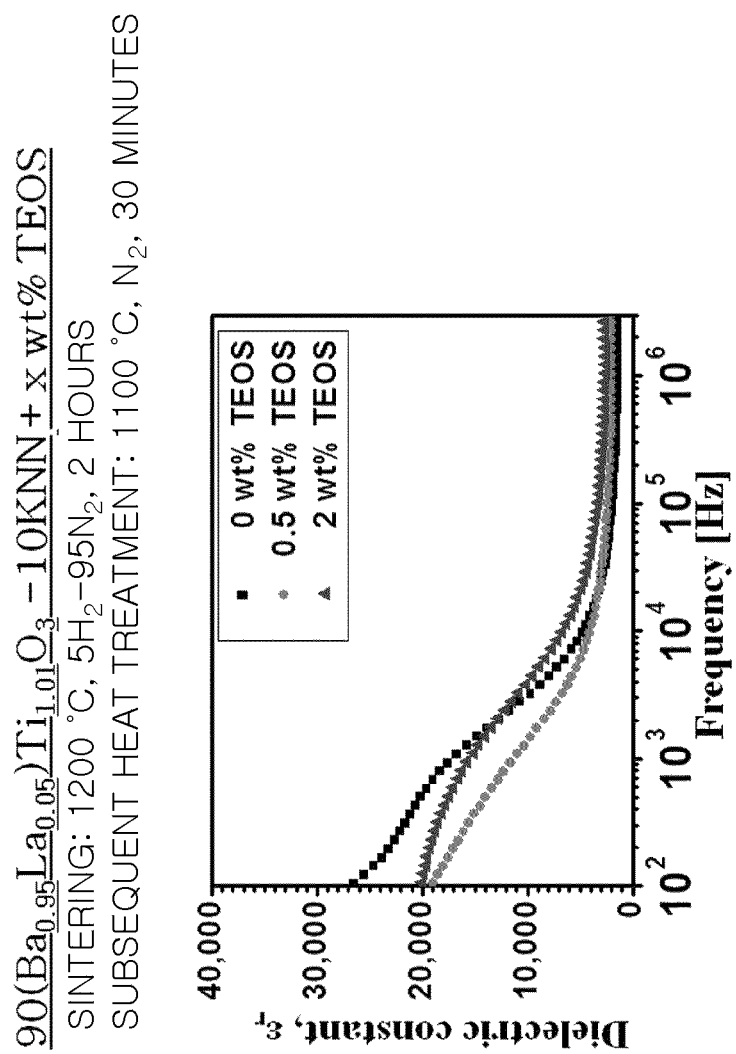
FIG. 11A is a graph illustrating changes in relative dielectric constant values according to the addition of TEOS in 90BT-10KNN in which an oxidizing atmosphere of a subsequent heat treatment process consists of an $N_2$ oxidizing atmosphere in (100-x)BT-xKNN.
Figure 11B:
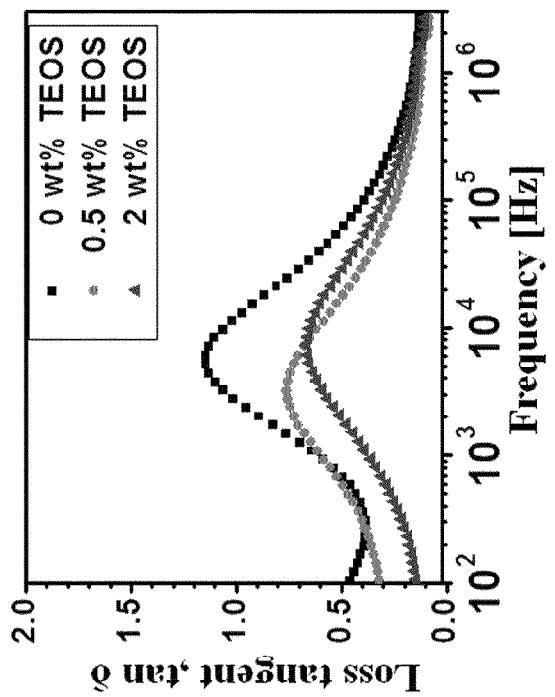
FIG. 11B is a graph illustrating changes in dielectric loss values.

90BT-10KNN in which an oxidizing atmosphere of a subsequent heat treatment process consists of a $N_2$ oxidizing atmosphere in (100-x)BT-xKNN, and FIG. 11B is a graph illustrating changes in dielectric loss values.

In 90BT-10KNN, the sintering under the reducing atmosphere and the subsequent heat treatment under the oxidizing atmosphere were performed under conditions of 1,200° C., $5H_2$-$95N_2$, and 2 hours and under conditions of 1,100° C., $N_2$, and 30 minutes, respectively, and the content of tetraethyl orthosilicate (TEOS) was measured at 0, 0.5, and 2 wt %. In comparison with FIG. 10A and FIG. 10B, in case where a predetermined amount of TEOS was added, a relative dielectric constant of 1,900 to 3,200 and a dielectric loss of 10 to 18% were exhibited in a frequency region of 1 MHz.

Figure 12A:
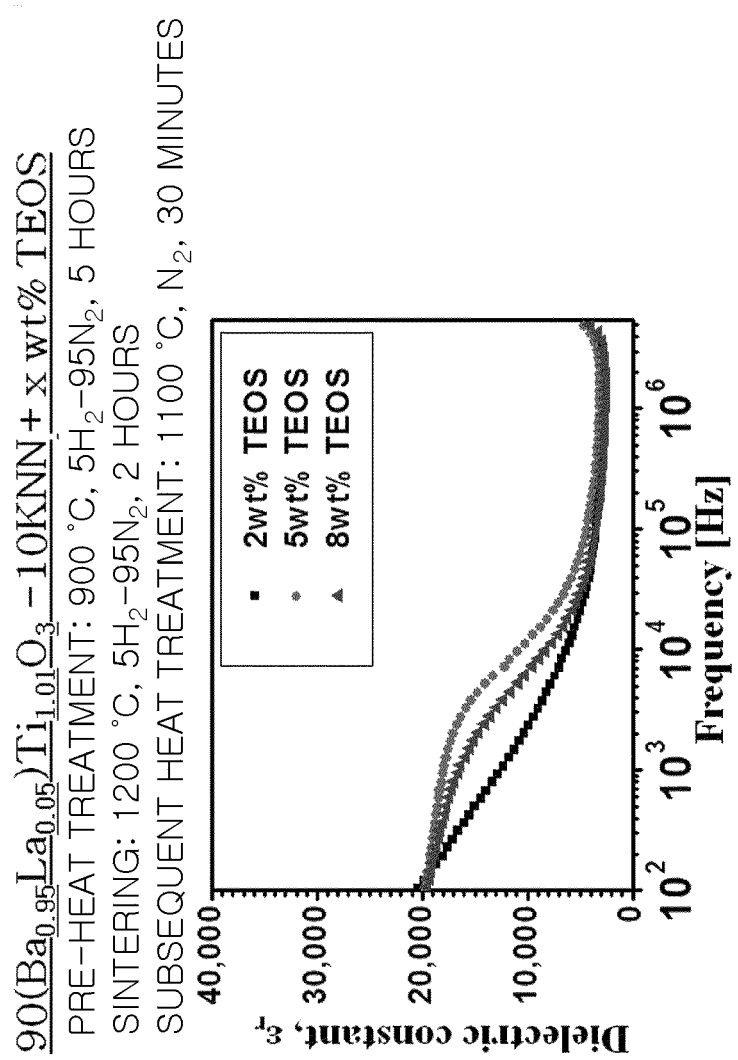
FIG. 12A is a graph illustrating changes in relative dielectric constant values when (100-x)BT-xKNN is subjected to pre-heat treatment (prefiring) as a pre-step of sintering in 90BT-10KNN in which an oxidizing atmosphere of a subsequent heat treatment process consists of an $N_2$ oxidizing atmosphere in (100-x)BT-xKNN.
Figure 12B:
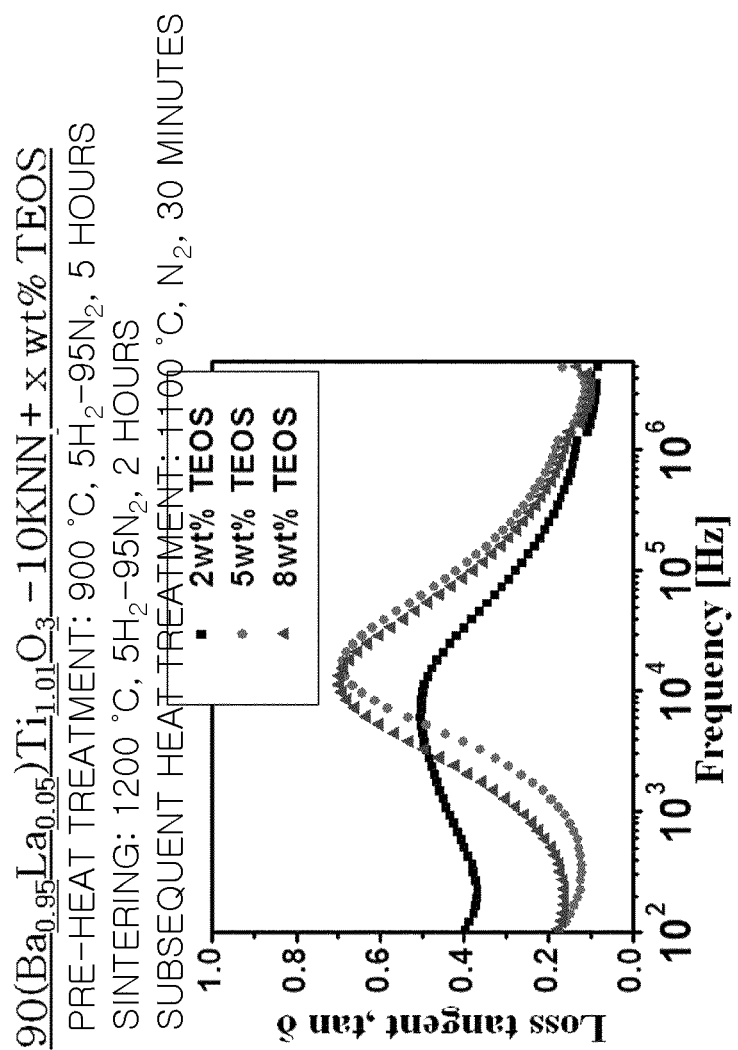
FIG. 12B is a graph illustrating changes in dielectric loss values.

FIG. 12A is a graph illustrating changes in relative dielectric constant values when (100-x)BT-xKNN is subjected to pre-heat treatment (prefiring) as a pre-step of sintering in 90BT-10KNN in which an oxidizing atmosphere of a subsequent heat treatment process consists of a $N_2$ oxidizing atmosphere in (100-x)BT-xKNN, and FIG. 12B is a graph illustrating changes in dielectric loss values.

TABLE 2

| | composition and annealing condition | | | | | dielectric characteristics | | | | | Dielectric loss, tan δ[%] | | | | |
|---|---|---|---|---|---|---|---|---|---|---|---|---|---|---|---|
| | donor | ferroelectric material | 2nd firing condition | | grain | dielectric constant, $\varepsilon_r$ | | | | | | | | | |
| sample no. | La [mol %] | KN [mol %] | temperature | atmosphere | size [μm] | 100 Hz | 1 kHz | 10 kHz | 100 kHz | 1 MHz | 100 Hz | 1 kHz | 10 kHz | 100 kHz | 1 MHz |
| 4 | 5 | 5 | 1200 | air | 0.3 | 144 | 141 | 140 | 137 | 141 | 1.8 | 1.8 | 1.0 | 2.0 | 1.5 |
| 5 | 5 | 10 | 1200 | air | 0.3 | 199 | 195 | 193 | 191 | 193 | 1.1 | 2.1 | 4.4 | 2.3 | 0.2 |

Figure 10A:
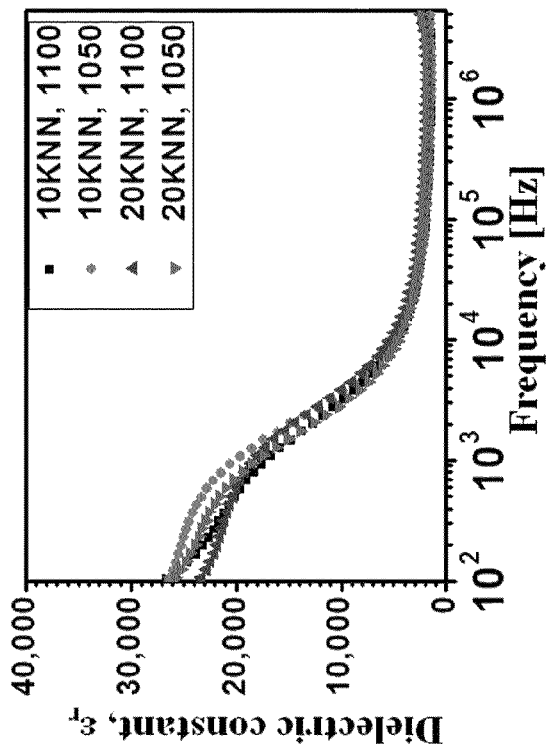
FIG. 10A is a graph illustrating changes in relative dielectric constant values according to the frequency measured in (100-x)BT-xKNN in which an oxidizing atmosphere of a subsequent heat treatment process consists of an $N_2$ atmosphere in (100-x)BT-xKNN.
Figure 10B:
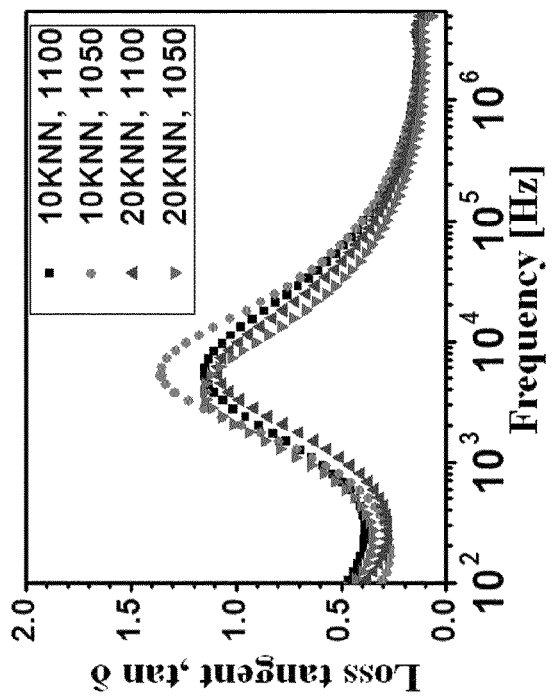
FIG. 10B is a graph illustrating changes in dielectric loss values.

FIG. 10A is a graph illustrating changes in relative dielectric constant values according to the frequency measured in (100-x)BT-xKNN in which an oxidizing atmosphere of a subsequent heat treatment process consists of a $N_2$ oxidizing atmosphere in (100-x)BT-xKNN, and FIG. 10B is a graph illustrating changes in dielectric loss values.

The sintering under the reducing atmosphere was performed under conditions of 1,200° C., $5H_2$-$95N_2$, and 2 hours, and the subsequent heat treatment under the oxidizing atmosphere was performed under conditions of 1,050 or 1,100° C., $N_2$, and 30 minutes, in 90BT-10KNN and 80BT-20KNN.

Through the experiment, it was confirmed that in a particle size of 0.2 μm to 1 μm in a high frequency region of 1 MHz, a relative dielectric constant of 1,400 to 3,000 was exhibited, and a dielectric loss value of 10 to 20% was exhibited.

FIG. 11A is a graph illustrating changes in relative dielectric constant values according to the addition of TEOS in When a pre-heat treatment (prefiring) process prior to sintering was performed under the same conditions as the conditions described in FIG. 11, the relative dielectric constant and the dielectric loss were measured. The pre-heat treatment (prefiring) was performed under conditions of 900° C., $5H_2$-$95N_2$, and 5 hours.

As an example, when the blue color graph (a relative dielectric constant when 2 wt % of TEOS was added) in FIG. 11A is compared with the black color graph (a relative dielectric constant when 2 wt % of TEOS was added) in FIG. 11A, it can be seen that when a pre-heat treatment (prefiring) prior to the sintering was performed, the change width of the dielectric constant is less than before, that is, the dielectric constant is relatively constantly maintained, regardless of the frequency region.

Figure 13A:
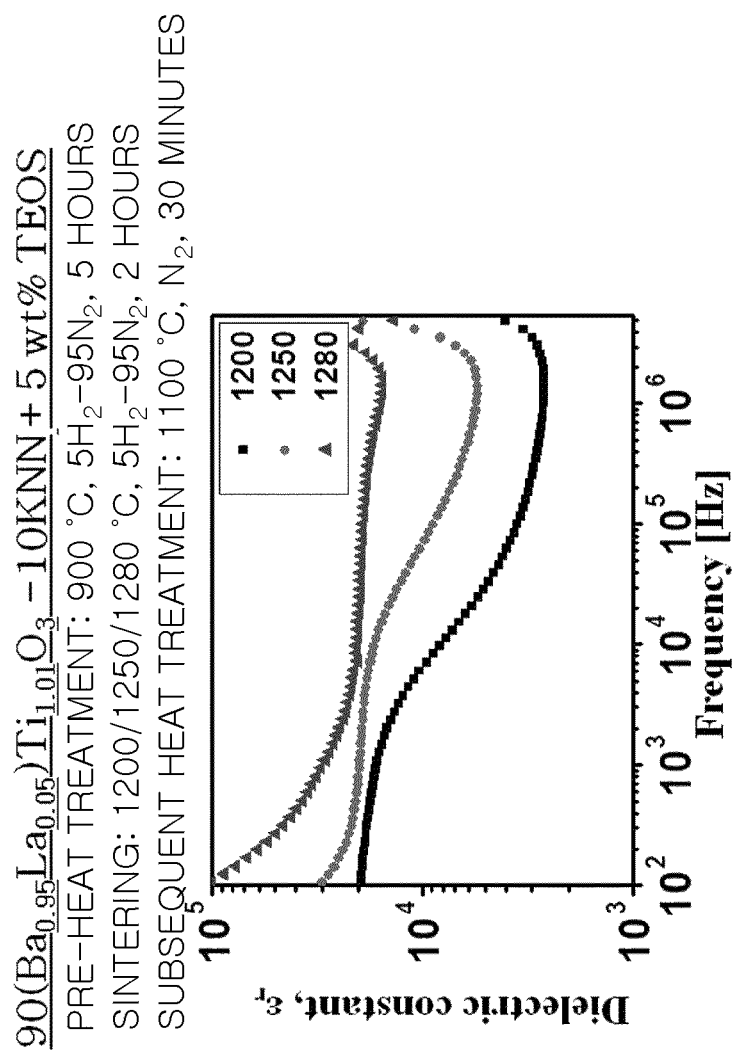
FIG. 13A is a graph illustrating changes in relative dielectric constant values of 90BT-10KNN according to the sintering temperature performed under a reducing atmosphere when a subsequent heat treatment process is performed under an $N_2$ oxidizing atmosphere in (100-x)BT-xKNN.
Figure 13B:
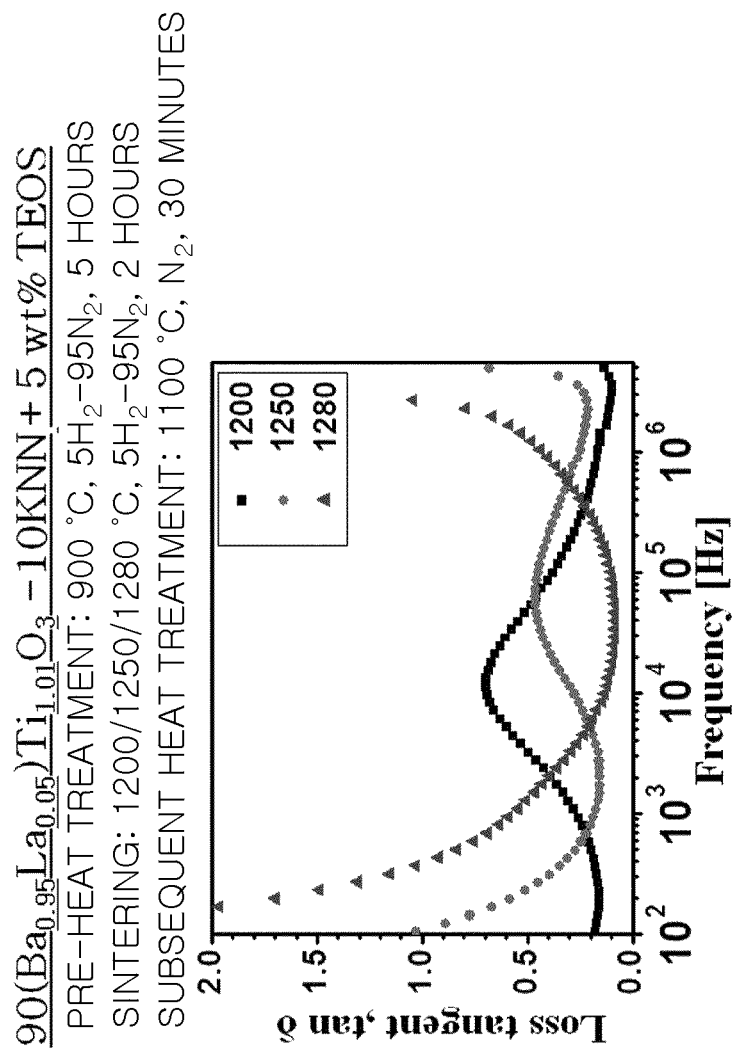
FIG. 13B is a graph illustrating changes in dielectric loss values.

FIG. 13A is a graph illustrating changes in relative dielectric constant values of 90BT-10KNN according to the sintering temperature performed under a reducing atmosphere when a subsequent heat treatment process is performed under a N₂ oxidizing atmosphere in (100-x)BT-xKNN, and FIG. 13B is a graph illustrating changes in dielectric loss values.

The sintering was performed at a temperature of 1,200° C., 1,250° C., and 1,280° C. under a reducing atmosphere.

In the following Table 3, data in FIGS. 10 to 13 are summarized.

TABLE 3

| | composition and annealing condition | | | | | dielectric characteristics | | | |
|---|---|---|---|---|---|---|---|---|---|
| | ferroelectric material | additive material | 2nd firing condition | | grain | $\varepsilon_r$ | | tan δ[%] | |
| sample no. | KNN [mol %] | TEOS [wt %] | temperature | atmosphere | size [μm] | 1 kHz | 1 MHz | 1 kHz | 1 MHz |
| 6 | 10 | 0 | 1100 | N₂ | 0.2 | 16,710 | 1,440 | 63.9 | 15.5 |
| 7 | 10 | 0 | 1050 | N₂ | 0.2 | 19,620 | 1,440 | 63.6 | 15.3 |
| 8 | 20 | 0 | 1100 | N₂ | 0.3 | 17,980 | 1,870 | 50.8 | 14.1 |
| 9 | 20 | 0 | 1050 | N₂ | 0.3 | 17,420 | 1,900 | 71.9 | 11.8 |
| 10 | 10 | 0.5 | 1100 | N₂ | 0.2 | 10,980 | 1,970 | 61.5 | 11.9 |
| 11 | 10 | 2 | 1100 | N₂ | 0.2 | 12,280 | 2,800 | 44.2 | 13.3 |
| 12 | 10 | 5 | 1100 | N₂ | 0.2 | 17,900 | 3,130 | 17.5 | 18.1 |
| 13 | 10 | 8 | 1100 | N₂ | 0.2 | 16,330 | 2,640 | 28.0 | 16.2 |

Figure 14A:
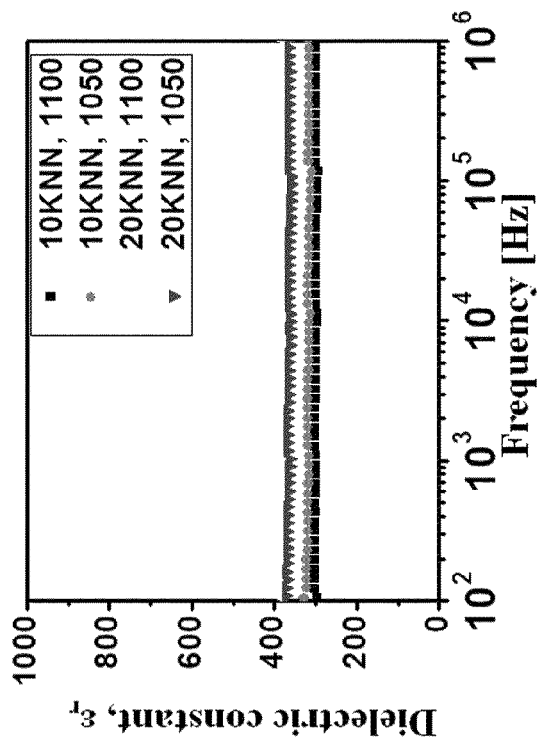
FIG. 14A is a graph illustrating changes in relative dielectric constant values according to the frequency measured in (100-x)BT-xKNN in which an oxidizing atmosphere of a subsequent heat treatment process consists of a normal pressure (air) oxidizing atmosphere in (100-x)BT-xKNN.
Figure 14B:
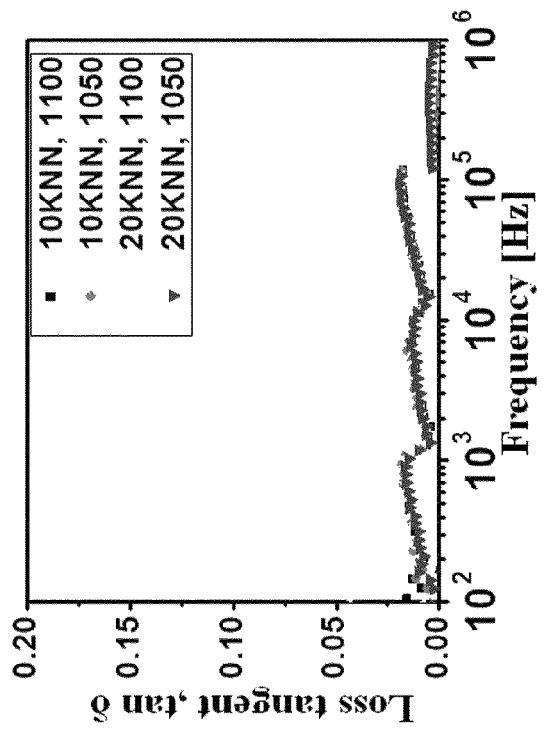
FIG. 14B is a graph illustrating changes in dielectric loss values.

FIG. 14A is a graph illustrating changes in relative dielectric constant values according to the frequency measured in (100-x)BT-xKNN in which an oxidizing atmosphere of a subsequent heat treatment process consists of a normal pressure (air) oxidizing atmosphere in (100-x)BT-xKNN, and FIG. 14B is a graph illustrating changes in dielectric loss values.

The sintering under the reducing atmosphere was performed under conditions of 1,200° C., 5H₂-95N₂, and 2 hours, and the subsequent heat treatment under the oxidizing atmosphere was performed under conditions of 1,050 or 1,100° C., normal pressure (air), and 30 minutes, in 90BT-10KNN and 80BT-20KNN.

Referring to FIG. 14, it can be confirmed that the relative dielectric constant and dielectric loss values are constantly maintained without a significant change, regardless of the frequency region. It was confirmed that numerically, in a particle size of 0.2 μm to 1 μm, the relative dielectric constant was maintained within a change width of about 0 to about 20, and the dielectric loss was maintained within a change width of about 0% to about 2%.

Figure 15A:
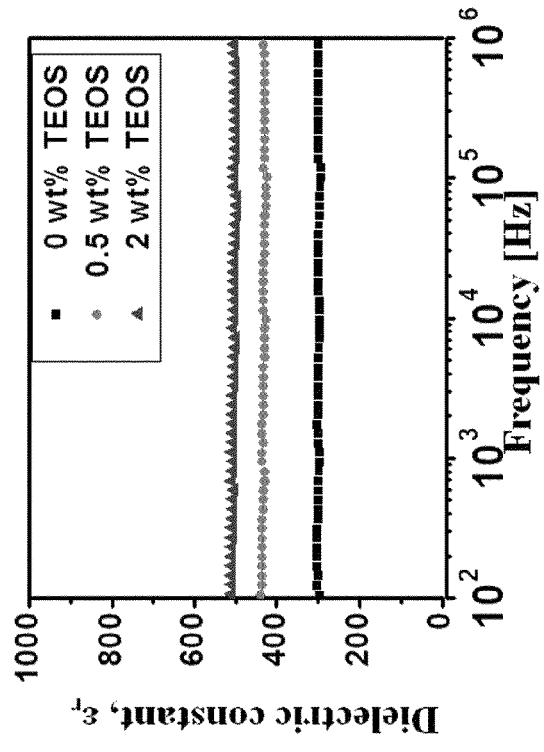
FIG. 15A is a graph illustrating changes in relative dielectric constant values according to the addition of TEOS in 90BT-10KNN in which an oxidizing atmosphere of a subsequent heat treatment process consists of a normal pressure (air) oxidizing atmosphere in (100-x)BT-xKNN.
Figure 15B:
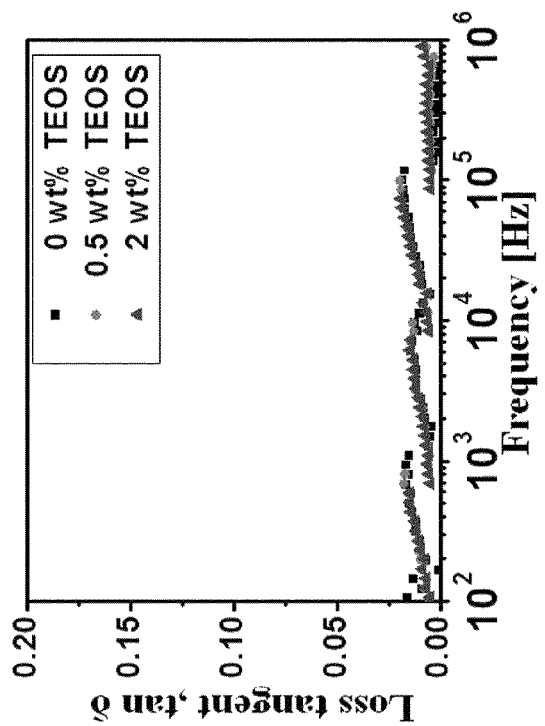
FIG. 15B is a graph illustrating changes in dielectric loss values.

FIG. 15A is a graph illustrating changes in relative dielectric constant values according to the addition of TEOS in 90BT-10KNN in which an oxidizing atmosphere of a subsequent heat treatment process consists of a normal pressure (air) oxidizing atmosphere in (100-x)BT-xKNN, and FIG. 15B is a graph illustrating changes in dielectric loss values.

In 90BT-10KNN, the sintering under the reducing atmosphere and the heat treatment under the oxidizing atmosphere were performed under conditions of 1,200° C., 5H₂-95N₂, and 2 hours and under conditions of 1,100° C., normal pressure (air), and 30 minutes, respectively, and the content of tetraethyl orthosilicate (TEOS) was measured at 0, 0.5, and 2 wt %. In comparison with FIG. 14A and FIG. 14B, in the case where a predetermined amount of TEOS is added, it can be confirmed that in a frequency region of 1 MHz, a less change width is maintained than in a frequency region than in a range where the relative dielectric constant and the dielectric loss are high.

Figure 16A:
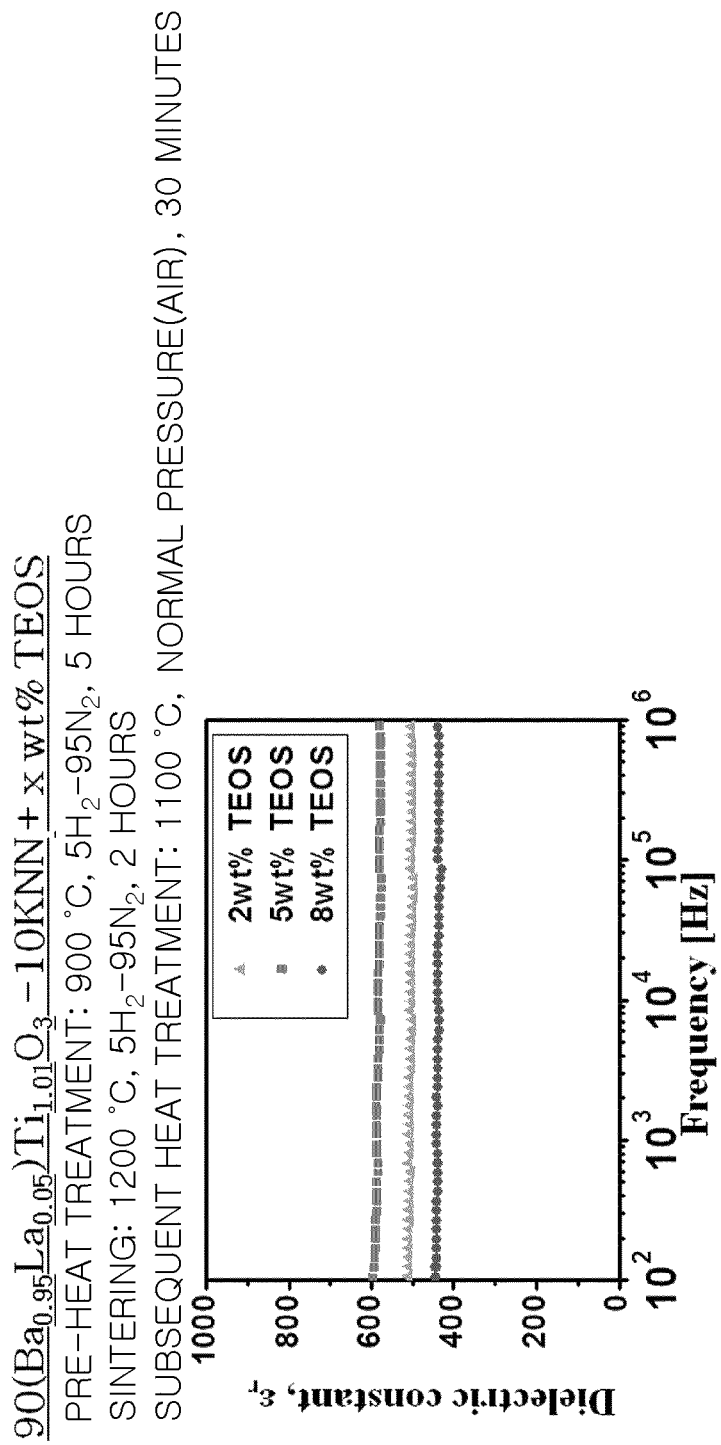
FIG. 16A is a graph illustrating changes in relative dielectric constant values when (100-x)BT-xKNN is subjected to pre-heat treatment (prefiring) as a pre-step of sintering in 90BT-10KNN in which an oxidizing atmosphere of a subsequent heat treatment process consists of a normal pressure (air) oxidizing atmosphere in (100-x)BT-xKNN.
Figure 16B:
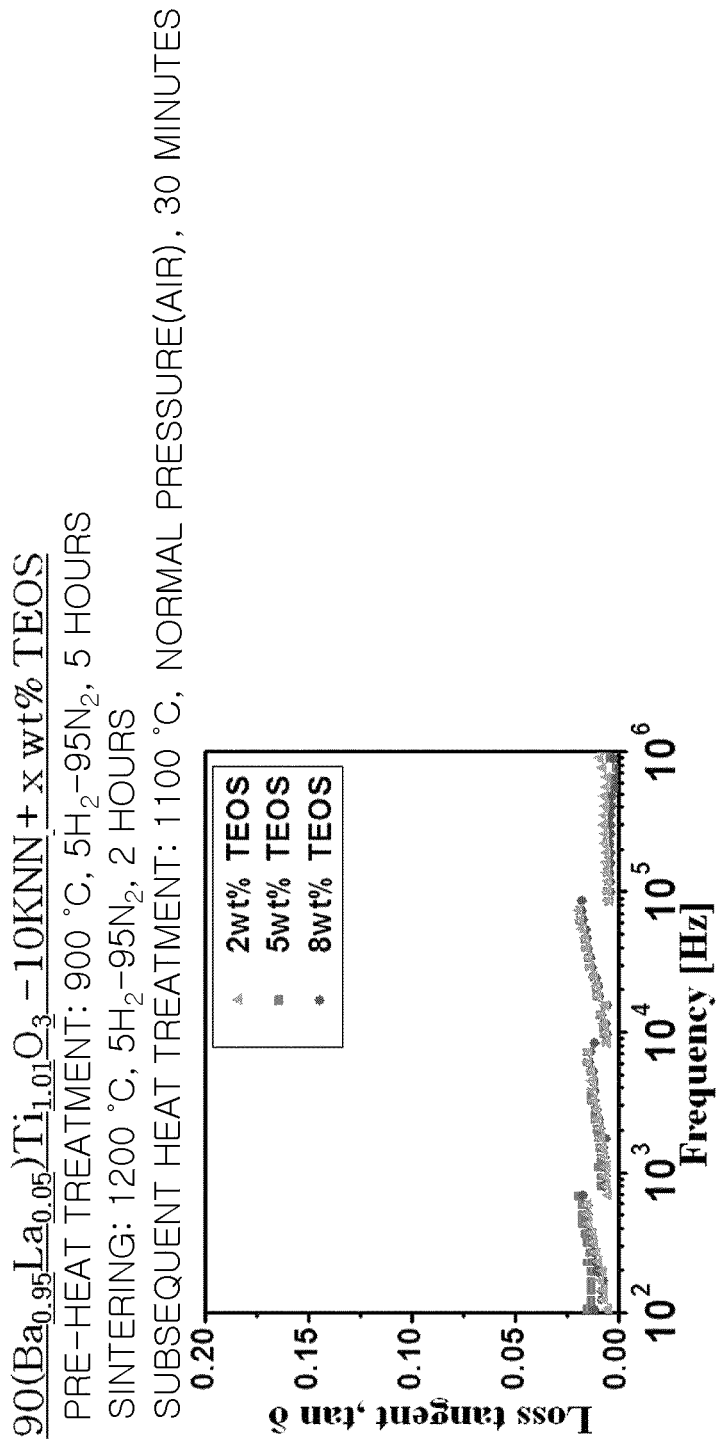
FIG. 16B is a graph illustrating changes in dielectric loss values.

FIG. 16A is a graph illustrating changes in relative dielectric constant values when (100-x)BT-xKNN is subjected to pre-heat treatment (prefiring) as a pre-step of sintering in 90BT-10KNN in which an oxidizing atmosphere of a subsequent heat treatment process consists of a normal pressure (air) oxidizing atmosphere in (100-x)BT-xKNN, and FIG. 16B is a graph illustrating changes in dielectric loss values.

When a pre-heat treatment (prefiring) process prior to sintering was performed under the same conditions as the conditions described in FIG. 15, the relative dielectric constant and the dielectric loss were measured. The pre-heat treatment (prefiring) was performed under conditions of 900° C., 5H₂-95N₂, and 5 hours.

When compared with FIG. 15, it can be confirmed that when the pre-heat treatment (prefiring) prior to sintering is performed, a less change width is maintained than in a range where the relative dielectric constant and the dielectric loss are high.

Figure 17A:
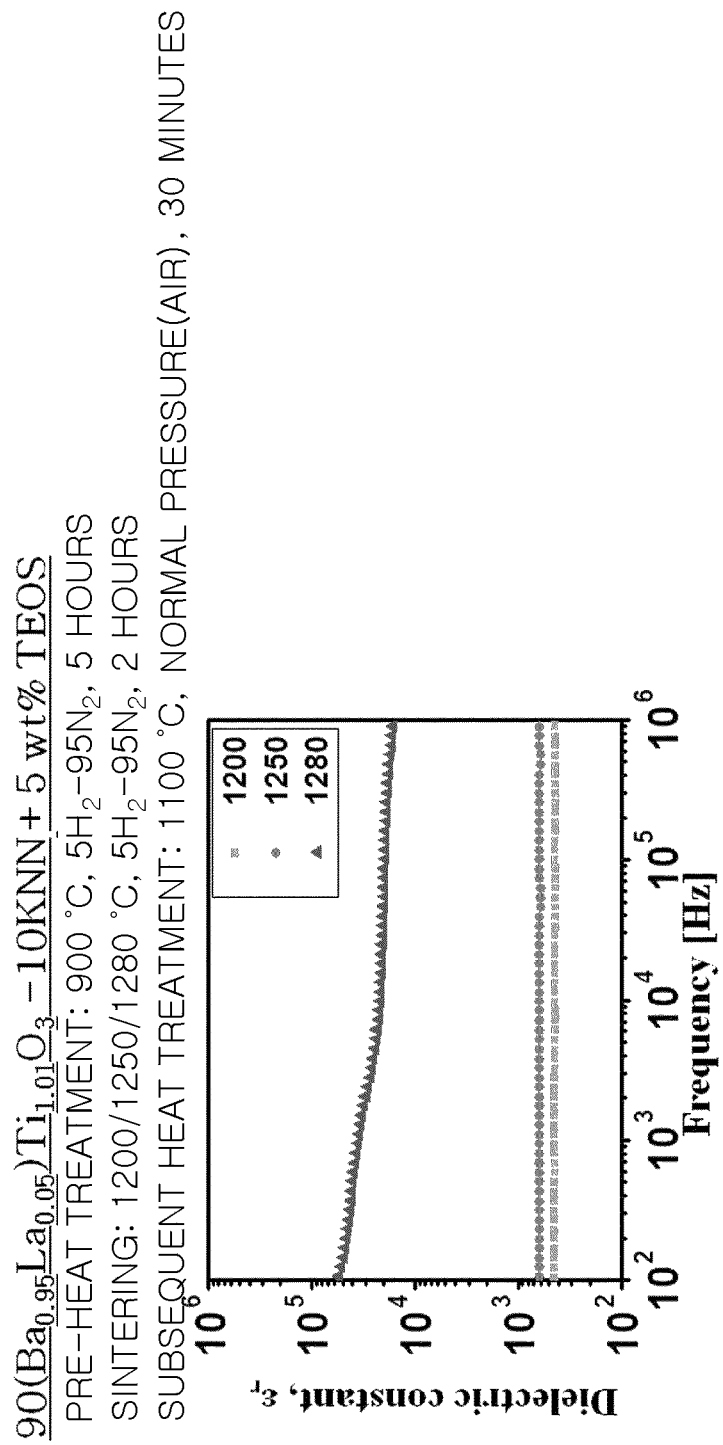
FIG. 17A is a graph illustrating changes in relative dielectric constant values of 90BT-10KNN according to the sintering temperature under a reducing atmosphere when a subsequent heat treatment process is performed under normal pressure (air) oxidizing atmosphere in (100-x)BT-xKNN.
Figure 17B:
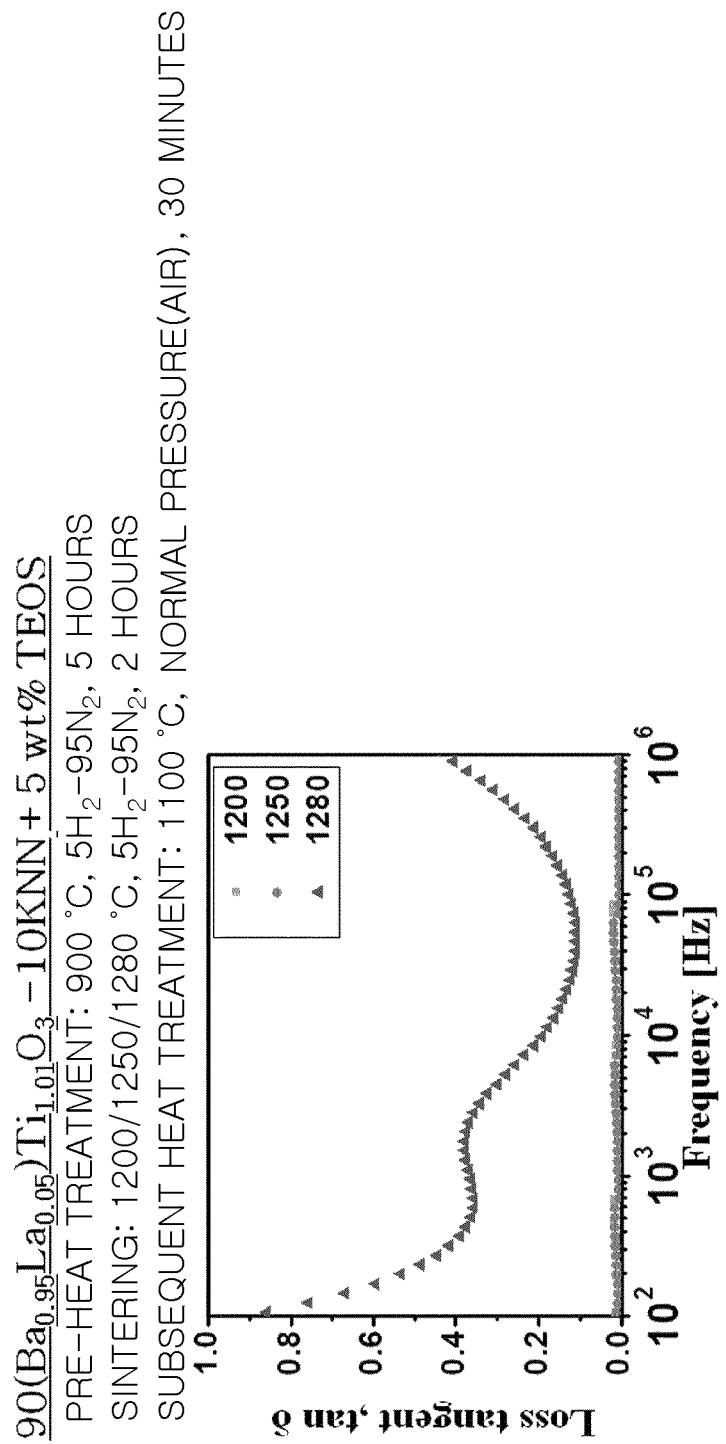
FIG. 17B is a graph illustrating changes in dielectric loss values.

FIG. 17A is a graph illustrating changes in relative dielectric constant values of 90BT-10KNN according to the sintering temperature under a reducing atmosphere when a subsequent heat treatment process is performed under a normal pressure (air) oxidizing atmosphere in (100-x)BT-xKNN, and FIG. 17B is a graph illustrating changes in dielectric loss values.

The sintering was performed at a temperature of 1,200° C., 1,250° C., and 1,280° C. under a reducing atmosphere.

In the following Table 4, data in FIGS. 14 to 17 are summarized.

TABLE 4

| | composition and annealing condition | | | | | dielectric characteristics | | | | | | | | | |
|---|---|---|---|---|---|---|---|---|---|---|---|---|---|---|---|
| | ferroelectric material | additive material | 2nd firing condition | | grain | dielectric constant, $\varepsilon_r$ | | | | | Dielectric loss, tan δ[%] | | | | |
| sample no. | KNN [mol %] | TEOS [wt %] | temperature | atmosphere | size [μm] | 100 Hz | 1 kHz | 10 kHz | 100 kHz | 1 MHz | 100 Hz | 1 kHz | 10 kHz | 100 kHz | 1 MHz |
| 14 | 10 | 0 | 1100 | air | 0.2 | 297 | 297 | 296 | 294 | 300 | 1.6 | 1.5 | 0.9 | 1.8 | 0.4 |
| 15 | 10 | 0 | 1050 | air | 0.2 | 329 | 315 | 314 | 311 | 317 | 1.8 | 1.6 | 1.1 | 1.8 | 0.8 |
| 16 | 20 | 0 | 1100 | air | 0.3 | 387 | 375 | 378 | 378 | 381 | 1.1 | 1.6 | 1.2 | 0.3 | 0.7 |
| 17 | 20 | 0 | 1050 | air | 0.3 | 370 | 363 | 365 | 366 | 368 | 1.2 | 1.4 | 1.2 | 0.4 | 1.1 |
| 18 | 10 | 0.5 | 1100 | air | 0.2 | 438 | 434 | 433 | 423 | 433 | 0.5 | 0.5 | 0.6 | 1.9 | 0.7 |
| 19 | 10 | 2 | 1100 | air | 0.2 | 511 | 509 | 506 | 503 | 504 | 0.5 | 0.6 | 0.7 | 0.5 | 1.0 |
| 20 | 10 | 5 | 1100 | air | 0.2 | 595 | 586 | 583 | 580 | 582 | 1.4 | 0.9 | 0.7 | 0.4 | 0.4 |
| 21 | 10 | 8 | 1100 | air | 0.2 | 444 | 441 | 439 | 437 | 439 | 1.1 | 0.5 | 0.6 | 0.3 | 0.3 |

Representative exemplary embodiments of the present invention have been described in detail, but it is to be understood by a person with ordinary skill in the art to which the present invention pertains that various modifications are possible with respect to the above-described example within the limitation without departing from the scope of the present invention. Therefore, the right scope of the present invention should not be defined by being limited to the described Examples, and should be defined by not only the claims to be described below, but also those equivalent to the claims.

What is claimed is:

1. A method for preparing a grain boundary insulation-type dielectric, the method comprising:
    obtaining a titanic acid compound and a ferroelectric material having a melting point less than a melting point of the titanic acid compound;
    obtaining a mixture by adding the ferroelectric material to the titanic acid compound; and
    sintering the mixture at a temperature equal to or more than a melting point of the ferroelectric material,
    wherein the titanic acid compound is $(Sr_xLa_y)Ti_zO_3$, where 0.95≤x≤0.99, 0.01≤y≤0.05, 1.00≤z≤1.01, and x+y=1, and
    wherein the ferroelectric material is $K_{0.5}Na_{0.5}NbO_3$.

2. The method of claim 1, wherein the sintering comprises sintering under a reducing atmosphere and a subsequent heat treatment under an oxidizing atmosphere, and the subsequent heat treatment under the oxidizing atmosphere is performed under normal pressure.

3. A method of claim 1, for preparing a grain boundary insulation-type dielectric, the method comprising:
    obtaining a titanic acid compound and a ferroelectric material having a melting point less than a melting point of the titanic acid compound;
    obtaining a mixture by adding the ferroelectric material to the titanic acid compound; and
    sintering the mixture at a temperature equal to or more than a melting point of the ferroelectric material,
    wherein the titanic acid compound is $(Ba_xLa_y)Ti_zO_3$, where 0.95≤x≤0.99, 0.01≤y≤0.05, 1.00≤z≤1.01, and x+y=1, and
    wherein the ferroelectric material is $K_{0.5}Na_{0.5}NbO_3$.

4. The method of claim 3, further comprising adding tetraethyl orthosilicate (TEOS) to the mixture of the titanic acid compound and the ferroelectric material.

5. The method of claim 3, further comprising subjecting the mixture to pre-heat treatment (prefiring) prior to the sintering.

6. The method of claim 3, wherein the sintering comprises sintering under a reducing atmosphere and a subsequent heat treatment under an oxidizing atmosphere, and the subsequent heat treatment under the oxidizing atmosphere is performed under a $N_2$ atmosphere or normal pressure.

7. The method of claim 1, wherein an addition ratio of the ferroelectric material is 2 to 20 mol% based on the titanic acid compound.

8. A grain boundary insulation-type dielectric wherein a ferroelectric material, which is $K_{0.5}Na_{0.5}NbO_3$, in $(Sr_xLa_y)Ti_zO_3$, which is a strontium titanate compound, is distributed at a grain boundary of the strontium titanate compound, where 0.95≤x≤0.99, 0.01≤y≤0.05, 1.00≤z≤1.01, and x+y=1.

9. The grain boundary insulation-type dielectric of claim 8, wherein the grain boundary insulation-type dielectric has an average particle size of 0.3 μm to 1 μm.

10. The grain boundary insulation-type dielectric of claim 8, wherein the grain boundary insulation-type dielectric has a relative dielectric constant of 4,500 to 6,000 and a dielectric loss of 2 to 5% in a frequency region of 1 MHz or more.

11. A grain boundary insulation-type dielectric wherein a ferroelectric material, which is $K_{0.5}Na_{0.5}NbO_3$, in $(Ba_xLa_y)Ti_zO_3$, which is a barium titanate compound, is distributed at a grain boundary of the barium titanate compound,
    where 0.95≤x≤0.99, 0.01≤y≤0.05, 1.00≤z≤1.01, and x+y=1.

12. The grain boundary insulation-type dielectric of claim 11, wherein the grain boundary insulation-type dielectric has an average particle size of 0.2 μm to 1μm.

13. The grain boundary insulation-type dielectric of claim 11, wherein the grain boundary insulation-type dielectric has a relative dielectric constant of 1,400 to 3,200 and a dielectric loss of 10 to 20% in a frequency region of 1 MHz or more.

14. The grain boundary insulation-type dielectric of claim 11, wherein in the grain boundary insulation-type dielectric, a change width in relative dielectric constant is maintained at 0 to 20 and a change width in dielectric loss is maintained at 0 to 2%, regardless of the frequency region.

15. The grain boundary insulation-type dielectric of claim 8, wherein a ratio of the ferroelectric in the grain boundary insulation-type dielectric is 2 to 20 mol% based on the titanic acid compound.

16. The method grain boundary insulation-type dielectric of claim 11, wherein a ratio of the ferroelectric in the grain boundary insulation-type dielectric is 2 to 20 mol% based on the titanic acid compound.

* * * * *

UNITED STATES PATENT AND TRADEMARK OFFICE
CERTIFICATE OF CORRECTION

PATENT NO. : 10,577,285 B2  
APPLICATION NO. : 15/972660  
DATED : March 3, 2020  
INVENTOR(S) : Sung Yoon Chung et al.

Page 1 of 1

It is certified that error appears in the above-identified patent and that said Letters Patent is hereby corrected as shown below:

In the Claims

Column 19, Line 48, Claim 3, after "method" delete "of claim 1,"

Column 20, Line 62, Claim 16, before "grain" delete "method"

Signed and Sealed this
Twenty-third Day of June, 2020

Andrei Iancu
*Director of the United States Patent and Trademark Office*